United States Patent
Brown et al.

(10) Patent No.: US 10,831,167 B2
(45) Date of Patent: Nov. 10, 2020

(54) FIRE ALARM INSPECTION APPLICATION AND USER INTERFACE

(71) Applicant: Tyco Fire & Security GmbH, Neuhausen am Rheinfall (CH)

(72) Inventors: Tyler Brown, Milford, CT (US); Oana Secara, Cork (IE)

(73) Assignee: Johnson Controls Fire Protection LP, Boca Raton, FL (US)

( * ) Notice: Subject to any disclaimer, the term of this patent is extended or adjusted under 35 U.S.C. 154(b) by 0 days.

(21) Appl. No.: 16/248,398

(22) Filed: Jan. 15, 2019

(65) Prior Publication Data
US 2019/0146444 A1    May 16, 2019

Related U.S. Application Data

(63) Continuation of application No. 15/600,509, filed on May 19, 2017, now Pat. No. 10,216,164.
(Continued)

(51) Int. Cl.
| | |
|---|---|
| *G05B 19/042* | (2006.01) |
| *G08B 19/00* | (2006.01) |
| *G08B 25/14* | (2006.01) |
| *G05B 15/02* | (2006.01) |
| *G06F 3/0481* | (2013.01) |
| *G06F 3/0482* | (2013.01) |
| *G06F 3/0488* | (2013.01) |
| *G06K 19/06* | (2006.01) |
| *G06K 19/07* | (2006.01) |

(Continued)

(52) U.S. Cl.
CPC ......... *G05B 19/0426* (2013.01); *G05B 15/02* (2013.01); *G06F 3/0482* (2013.01); *G06F 3/0488* (2013.01); *G06F 3/04817* (2013.01); *G06K 19/06028* (2013.01); *G06K 19/0717* (2013.01); *G06K 19/07749* (2013.01); *G08B 19/005* (2013.01); *G08B 25/10* (2013.01); *G08B 25/14* (2013.01); *G08B 29/145* (2013.01); *G05B 2219/2642* (2013.01)

(58) Field of Classification Search
CPC ....... G08B 29/00; G08B 29/04; G08B 29/145
See application file for complete search history.

(56) References Cited

U.S. PATENT DOCUMENTS

| | | | |
|---|---|---|---|
| 6,553,336 B1 | 4/2003 | Johnson et al. | |
| 7,346,433 B2 | 3/2008 | Budike, Jr. | |

(Continued)

*Primary Examiner* — Kevin Kim
(74) *Attorney, Agent, or Firm* — HoustonHogle LLP

(57) ABSTRACT

A system and method for facilitating inspection of fire alarm systems includes a graphical user interface rendered on a touchscreen display of a mobile computing device receiving selections of inspection results. The graphical user interface includes a testing pane, which indicates devices that are currently being tested, and a selection pane, which indicates devices yet to be tested. The devices indicated by the selection pane are filtered according to the inferred location of the inspector or the inferred order of test. Selection of devices indicated by the selection pane results in those devices being indicated by the testing pane. Results of inspections of the devices indicated by the testing pane are then selected by the touchscreen display detecting gestures (e.g. swipes toward the left or right) corresponding to different results. The results are sent to a connected services system and stored in a connected services database.

23 Claims, 19 Drawing Sheets

Related U.S. Application Data

(60) Provisional application No. 62/359,428, filed on Jul. 7, 2016.

(51) Int. Cl.
    *G06K 19/077*     (2006.01)
    *G08B 25/10*     (2006.01)
    *G08B 29/14*     (2006.01)

(56) References Cited

U.S. PATENT DOCUMENTS

| | | |
|---|---|---|
| 7,603,458 B1 | 10/2009 | Sexton et al. |
| 8,947,437 B2 | 2/2015 | Garr et al. |
| 9,098,831 B1 | 8/2015 | Miles et al. |
| 9,513,364 B2 | 12/2016 | Hall et al. |
| 2003/0200483 A1* | 10/2003 | Sutton ................ G01R 31/2834 714/25 |
| 2004/0254963 A1 | 12/2004 | Bradley et al. |
| 2008/0084291 A1* | 4/2008 | Campion ............. G08B 29/123 340/514 |
| 2009/0271297 A1 | 10/2009 | McCracken et al. |
| 2011/0200052 A1 | 8/2011 | Mungo et al. |
| 2012/0265633 A1 | 10/2012 | Wohlstadter et al. |
| 2013/0212434 A1* | 8/2013 | Janky ..................... H04L 43/50 714/27 |
| 2013/0218890 A1 | 8/2013 | Fernandes et al. |
| 2014/0109004 A1 | 4/2014 | Sadhvani et al. |
| 2014/0189887 A1 | 7/2014 | Raju |
| 2014/0279225 A1* | 9/2014 | Friedman ........... G06Q 30/0609 705/26.35 |
| 2014/0325363 A1 | 10/2014 | Fletcher et al. |
| 2015/0242859 A1* | 8/2015 | Viswanath ......... G06Q 30/0641 705/44 |
| 2015/0249548 A1 | 9/2015 | Rasband et al. |
| 2015/0285896 A1 | 10/2015 | Hall et al. |
| 2015/0286934 A1 | 10/2015 | Rasband et al. |
| 2015/0287296 A1 | 10/2015 | Hall et al. |
| 2015/0294409 A1 | 10/2015 | Madhavan |
| 2015/0332198 A1 | 11/2015 | Toro |
| 2016/0026773 A1 | 1/2016 | Chu et al. |
| 2016/0103581 A1 | 4/2016 | Kim et al. |
| 2016/0127292 A1* | 5/2016 | Birger .................... H04L 51/16 709/206 |
| 2017/0023377 A1* | 1/2017 | Burtner ................. G06Q 10/00 |
| 2017/0084146 A1 | 3/2017 | Hall et al. |
| 2017/0372339 A1 | 12/2017 | Davis |
| 2018/0011455 A1 | 1/2018 | Camarasa et al. |
| 2018/0011461 A1 | 1/2018 | Camarasa et al. |
| 2018/0012482 A1 | 1/2018 | Brown et al. |

\* cited by examiner

FIRE ALARM INSPECTION APPLICATION AND USER INTERFACE

RELATED APPLICATIONS

This application is a Continuation of U.S. patent application Ser. No. 15/600,509, filed on May 19, 2017, which claims the benefit under 35 USC 119(e) of U.S. Provisional Application No. 62/359,428, filed on Jul. 7, 2016, both of which are incorporated herein by reference in their entirety.

This application is related to U.S. application Ser. No. 15/446,256 filed on Mar. 1, 2017, entitled "Building Asset Management System", now U.S. Patent Publication No.: 2018-0011461, and U.S. application Ser. No. 15/446,289 filed on Mar. 1, 2017, entitled "Building Management System Method and Interface", now U.S. Patent Publication No.: 2018-0011455, both of which are incorporated herein by reference in their entirety.

BACKGROUND OF THE INVENTION

Fire alarm systems are often installed within commercial, residential, or governmental buildings. Examples of these buildings include hospitals, warehouses, schools, shopping malls, government buildings, and casinos, to list a few examples. The fire alarm systems typically include fire alarm devices such as a control panel, fire alarm initiating devices, and notification devices. Some examples of alarm initiating devices include smoke detectors, carbon monoxide detectors, temperature sensors, and pull stations. Similarly, notification devices include speakers, horns, bells, chimes, light emitting diode (LED) reader boards, and/or flashing lights (e.g., strobes), to list a few examples.

The alarm initiating devices monitor the buildings for indicators of fire. Upon detection of indicators of fire, device signals are sent from the alarm initiating devices to the control panel. The device signals are typically alarm signals and/or analog values. In general, the alarm signals are generated by alarm initiating devices in the situation where the alarm initiating devices themselves determine whether ambient conditions are indicative of a fire. The alarm signals are used to signal the control panel that a fire has been detected. Alternatively, some devices provide analog values to indicate measured conditions. In one example, temperature sensors provide analog values for measured temperatures. In another example, smoke sensors provide analog values indicating smoke obscuration levels. The control panel then determines if the analog values are indicative of a fire. Additionally, in some examples, the alarm initiating devices provide both alarm signals and analog values.

In response to detection of indicators of fire, the control panel initiates an alarm condition, which often includes an evacuation of the building. Additionally, the control panel may also send a signal to a fire department, a central communications or receiving station, a local monitoring station, and/or other building alarm/notification systems (e.g., public address systems).

Typically, the fire alarm devices are periodically tested by inspectors (e.g., monthly, quarterly, or annually depending on fire or building codes) to verify that the devices are physically sound, unaltered, working properly, not obstructed, properly labeled, and located in their assigned locations. In general, the term inspector refers to any authorized person that inspects the alarm initiating device. Thus, the inspector could be a person that only inspects the devices or the inspector could be, for example, a technician that is also able to install, configure, and/or repair alarm systems.

This testing of the devices is often accomplished with a walkthrough test. Historically, walkthrough tests were performed by a team of at least two inspectors. The first inspector walked through the building and manually activated each fire detection and fire annunciation device while the second inspector remained at the control panel to verify that the control panel received a signal from the activated device. The inspectors would typically communicate via two-way radios or mobile phones to coordinate the testing of each device. In some cases, the inspectors might even have resorted to comparing handwritten notes of the tested devices. After a group of fire alarm devices was tested, the inspector at the panel reset the control panel while the other inspector moved to the next fire detection or fire annunciation device. One inspector stayed at the control panel and the other inspector moved through the building, activating each device (e.g., applying real or artificial smoke to smoke detectors, for example). Upon activation, the devices sent device signals to the control panel and the inspector at the control panel recorded results of the test.

Recently, single-person walkthrough systems have been proposed. In these systems, the technician connects a testing computer to the control panel and a first two-way radio. The technician then establishes a communications link with the first two-way radio using a second two-way radio and selecting the same radio frequency on both of the two-way radios. Alternatively, the technician may establish a communications link with cellular phones or a paging transmitter and pager.

During the walkthrough test, the technician placed one of the fire alarm devices into an alarm condition. The control panel detected the alarm condition of the activated device and sent a message containing the location and/or address of the activated device to the testing computer. Next, the computer converted the message received from the control panel to an audio stream and sent the audio stream to the technician over the communications link. The technician heard the location and/or address of the activated device and verified if the device was operating correctly. The testing process repeated with the next fire detection or fire annunciation device until all of the fire detection and fire annunciation devices of the alarm system have been verified.

More recently, it has been proposed to use connected services systems to monitor building management systems. In some cases, the control panels have been given network connectivity to communicate with the connected services systems; in other cases, the testing computers functioned as gateways. This has allowed the control panels to report status information to the connected services systems. These connected services systems will also often have remote diagnostic capabilities. As such, connected services systems enable communications between a control panel of a fire alarm system and a mobile computing device operated by an on-site inspector and thus can be used to facilitate the inspection process.

During an inspection, the connected services system receives event data from the control panel and sends the event data to the mobile computing device in real-time. Illustrated by way of example, upon activation of a fire alarm device, the control panel receives a signal from the activated device. Event data are generated and sent to the connected services system. The event data are stored and/or logged by the connected services system and also sent to the mobile computing device in real-time. The on-site technician is able to view the event data and verify that the fire alarm device is physically sound, unaltered, working properly, and in its assigned location. The technician then moves to test the next fire alarm device.

Additionally, self-testing fire detection devices have been proposed and implemented to varying degrees. In one specific example, a self-test circuit for a smoke detector periodically tests whether the sensitivity of a scattered light photodetector is within a predetermined range of acceptable sensitivities. If the sensitivity of the scattered light photodetector is out of the predetermined range of acceptable sensitivities, then a fault indication is produced. In self-testing systems, a device is selected by an inspector for self-testing, and, as a result, the control panel sends a testing signal to the device to initiate the self-testing process.

SUMMARY OF THE INVENTION

Walk-through inspections remain an essential aspect of fire alarm system maintenance and quality control. Fire alarm systems typically include a variety of fire alarm devices, many of which will not include self-testing functionality. Even for devices with self-testing capabilities, a manual inspection is often still necessary. Further, many components of fire alarm systems entirely lack network connectivity (for example, fire extinguishers) and must be inspected in person.

Despite advances in fire alarm inspection systems, walk-through inspections continue to offer several challenges. Many of these inspections occur in large facilities with complex fire alarm systems that will need to be navigated by the inspector. Additionally, the inspection process involves a variety of steps, some of which can be challenging, including locating and identifying fire alarm devices that need to be inspected, selecting specific devices to test and, if necessary, initiating a self-testing process, viewing device signal or event data generated by the devices under inspection in order to determine if the device passes or fails an inspection, viewing the results of self-tests conducted by devices, logging the results of device inspections, and sending those results to the connected services system to be stored.

Inspection systems relying on a connected services system to receive device signal and event data from the fire alarm devices being tested must be able to communicate that information to the inspector in real time, usually via a mobile application executing on a mobile computing device of the inspector, which communicates with the connected services system. It would be desirable for this mobile application to facilitate the walk-through inspection process, address some of the challenges of these inspections, and coordinate a variety of types of inspections involving a variety of types of devices via features of the application's graphical user interface (GUI).

According to the present invention, a mobile application of a mobile computing device renders a GUI on a touchscreen display. Generally, the GUI includes displayed information about the fire alarm system and its various devices. The GUI also provides a testing pane, which indicates which device or devices are currently being inspected. Devices can be indicated by graphical representations or textual information associated with the devices, or a combination of both. With a gesture (such as a swipe of the finger, for example), the inspector can pass or fail devices in the testing pane based on the results of one or a series of tests conducted by the inspector. In one example, swiping left fails the device, and swiping right passes the device.

The results are sent to be stored on the connected services system. An additional feature implements a predetermined delay between when the inspector inputs the results and when the results are sent to the connected services system (and the device no longer appears in the testing pane). During this delay, additional input allows the inspector to cancel the selection, resulting in the device remaining in the testing pane and the results not being sent to the connected services system.

In addition, the GUI includes a selection pane, which indicates devices that can be inspected. As in the testing pane, devices can be indicated by graphical icons or textual information associated with the devices, or a combination of both. In embodiments, the devices indicated by the selection pane can be filtered according to the inferred location of the inspector or the inferred order of inspection of the devices. In one example, the selection pane includes only devices that are physically near the last inspected device. In this way, the graphical user interface facilitates the navigation of the inspector through the fire alarm system.

Selection of the devices indicated by the selection pane (for example, by touching icons or textual information associated with the devices) results in the device being indicated by the testing pane as a device currently under inspection. When an inspector intends to test a specific device, they physically approach the device and then locate the graphical or textual representation of the device in the selection pane and select it. The representation then appears in the testing pane, which allows the inspector to pass or fail the device as previously discussed.

Non-network devices, such as fire extinguishers can also be selected for inspection by scanning barcodes or reading a radio frequency identification (RFID) tags attached to the devices. The device can be passed or failed via the testing pane, and the non-network devices can be identified and test results for the devices can be stored via the connected services system.

In general, according to one aspect, the invention features a system for inspection of fire alarm devices of a fire alarm system. An inspection application executing on a mobile computing device renders a graphical user interface on the mobile computing device's touchscreen display. The graphical user interface includes a testing pane for indicating the fire alarm devices currently under inspection. The testing pane also receives input from an inspector indicating results of the inspections. A connected services system receives and stores results of the inspections.

In embodiments, the graphical user interface includes displayed information about the fire alarm devices retrieved from the connected services system by the mobile computing device. A selection pane for indicates fire alarm devices to be inspected and receives input from the inspector indicating which fire alarm devices are currently under inspection. The devices indicated by the selection pane can be based on an inferred location of the inspector or an inferred order of inspection of the fire alarm devices. Different results are indicated by the input of the inspector based on whether contact with the touchscreen display detected by the mobile computing device corresponds with a predetermined gesture (for example, swiping). Devices are removed from being indicated by the testing pane in response to receiving input indicating the results of the inspections of those devices. However, the removal of the devices is delayed for a predetermined period of time, and, in response to further input from the inspector, the devices are not removed from being indicated by the testing pane, and the results of the inspections are not sent to the connected services system, allowing the inspector to cancel the input of results if desired. Devices can be selected for inspection, and therefore indicated by the testing pane, in response to the inspector scanning barcodes or reading RFID tags of the devices.

In general, according to another aspect, the invention features a method for facilitating inspection of fire alarm systems. A mobile application executing on a mobile computing device displays a graphical user interface on the mobile computing device's touchscreen display. The graphical user interface indicates fire alarm devices currently under inspection and receives input from an inspector indicating results of inspections of the fire alarm devices. The mobile computing device sends the results to a connected services system, and the connected services system storing the results.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
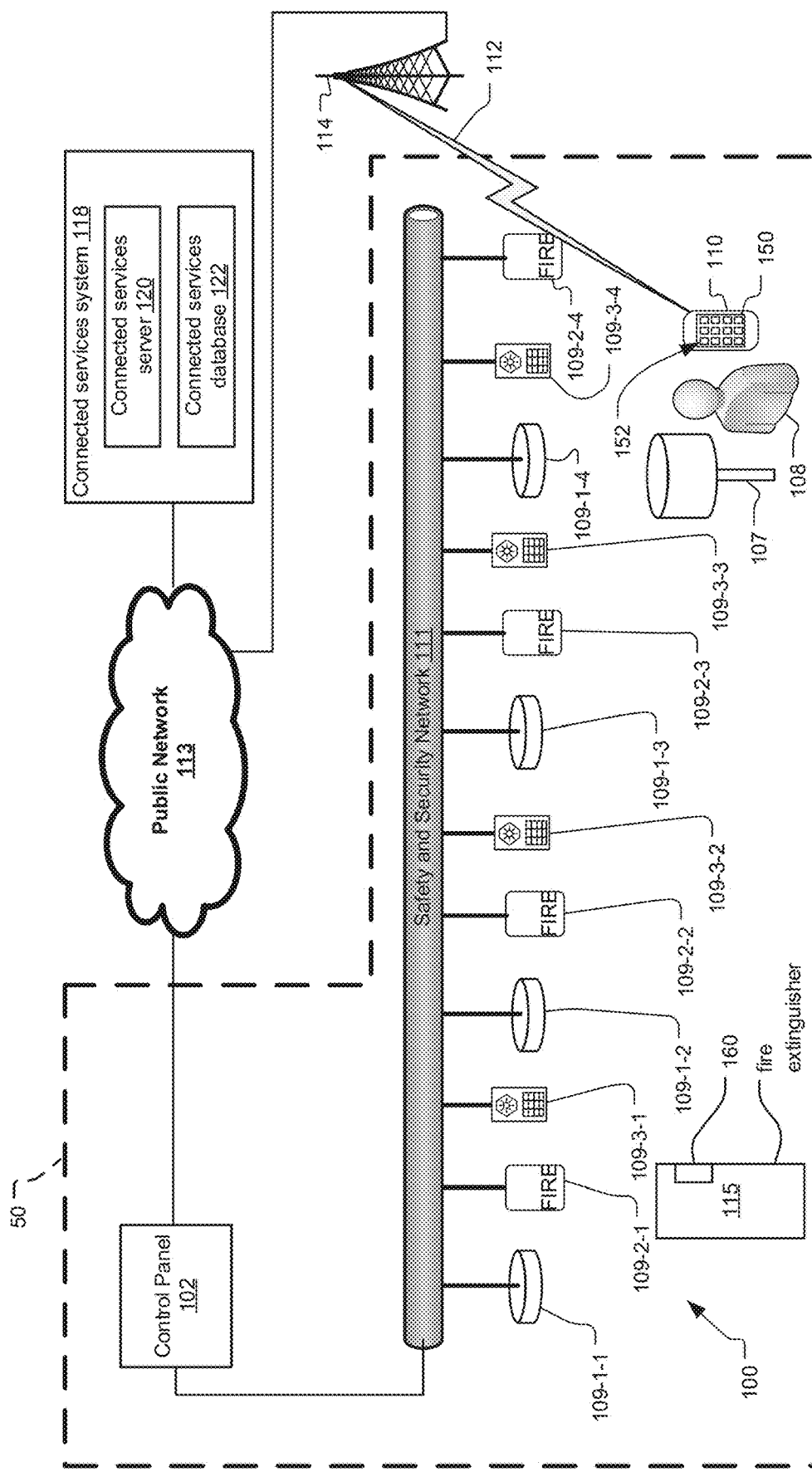
FIG. 1A is a block diagram illustrating a fire alarm system constructed according to the principles of the current invention.

FIG. 1A is a block diagram illustrating a fire alarm system 100, which includes fire alarm devices 109, 115, a control panel 102, and a connected services system 118.

Generally, the fire alarm system 100 is located within and/or outside a building 50, which could be residential, commercial, or governmental. Examples of the buildings include offices, hospitals, warehouses, retail establishments, shopping malls, schools, government buildings, or casinos, to list a few examples.

The control panel 102 is a device that directs the function of fire alarm system 100 by determining and displaying the operational status of connected fire alarm devices 109 by receiving alarm signals and/or analog values from fire initiation devices 109-1, 109-2, among other examples.

In a typical implementation, the connected fire alarm devices 109 include alarm initiation devices 109-1, 109-2, including smoke detectors 109-1 and manually activated devices such as pull stations 109-2. Alarm initiation devices can also include devices that are not depicted in the illustrated example, including carbon monoxide detectors and temperature sensors. In some embodiments, the smoke detectors also provide analog values that indicate a percentage of smoke obscuration or whether the detector is obstructed.

The connected fire alarm devices 109 further include fire notification devices, which generally include speakers, horns, bell, chimes, light emitting diode (LED) reader boards, and/or flashing lights (e.g., strobes), to list a few examples. The fire alarm system 100 in the illustrated example includes strobe lights 109-3, which blink to alert occupants of the building 50 in response to a fire alarm condition being initiated by the control panel 102.

Finally, the fire alarm system 100 includes a non-network fire alarm device 115 such as a fire extinguisher. The non-network fire alarm device 115 includes an identification mechanism 160. The identification mechanism 160 is used to identify the fire alarm device 100 by providing a unique identifier (such as an ID number or code) which, for example, can be associated with a record for the device by the connected services system 118. In embodiments, the identification mechanism 160 can include a barcode or a radio frequency identification tag, among other examples.

All of the connected fire alarm devices 109 are connected to the control panel 102 via a safety and security wired and/or wireless network 111 of the building 50. This network 111 supports data and/or analog communication between the fire alarm devices 109 and the control panel 102. Additionally, in some embodiments, security devices such as surveillance cameras, motion detectors, access control readers, public address systems, and/or intercom systems could also be connected to the safety and security network 111.

The control panel 102, in turn, is connected to the connected services system 118 via a leased data connection or public network 113, which is a wide-area network such as the internet.

In general, the connected services system 118 facilitates the monitoring, maintenance, testing, configuration and repair of fire alarm systems by gathering and storing information from connected fire alarm systems 100.

The connected services system 118 includes a connected services server 120 and a connected services database 122. The connected services server 120 receives information from various connected fire alarm systems 100 typically via the public network 113, and stores the information in the connected services database 122. The connected services system 118 gathers data from fire alarm systems by receiving information reported and transmitted from the fire alarm systems' 100 control panels 102, including device signal and event data generated by the connected fire alarm devices 109.

A mobile computing device 110, carried by an inspector 108, also sends and receives data to and from the connected services system 118 via the public network 113. In the illustrated example, the mobile computing device 110 is a smartphone device. Alternatively, the mobile computing device could be a laptop computer, tablet computer, or phablet computer (i.e., a mobile device that is typically larger than a smart phone, but smaller than a tablet), to list a few examples. The mobile computing device 110 connects to the public network 113 via a wireless communication link 112 to a cellular radio tower 114 of a mobile broadband or cellular network or public and/or private wired data networks such as an enterprise network, Wi-Max, or Wi-Fi network, for example.

The mobile computing device 110 includes a touchscreen display 150 on which a mobile application renders a graphical user interface (GUI) 152. In general, the GUI 152 displays information received by the mobile computing device 110 from the connected services system 118. The GUI also receives input, for example, from the inspector 108, and sends information based on that input to the connected services system 118.

In general, the inspector 108 can be any authorized person that inspects the fire alarm system 100. Some inspectors 108 may also have additional skills sets (e.g., fire fighting, or technical skills). Thus, the inspector 108 could be a person that only inspects the fire alarm system 100 or the inspector 108 could be, for example, a technician that is also able to install, configure, and/or repair fire alarm systems 100.

Typically, during an inspection of the fire alarm system 100, the inspector 108 places the connected fire alarm devices 109 into a test mode. Preferably, the test mode is initiated by the inspector 108 making a selection on the GUI 152 on the mobile computing device 110. In some devices, or in an alternative embodiment, the test mode can be activated via an inspector-activated mechanism (not illustrated) such as a magnetically actuated switch or a photodiode sensor triggered by a laser pointer. Upon activation of the test mode for one of the devices, a test mode signal is sent to the control panel 102 to indicate that the device should be placed into test mode by the control panel 102. This enables the inspector to perform a test on that device without initiating an alarm condition.

After the connected fire alarm device 109 is placed into test mode by the control panel 102, the device is inspected. For some devices with self-testing functionality, the control panel 102 initiates the inspection by sending a signal to the connected fire alarm device 109 to activate the device's self test routine. For other devices, the inspection is accomplished by the technician 108 using a testing apparatus 107. In one example, the connected fire alarm device 109 being tested is a smoke detector 109-1, and the testing apparatus 107 includes a hood that is placed over the smoke detector 109-1. The hood surrounds the smoke detector 109-1, and the testing apparatus 107 introduces real or artificial smoke into the hood. This artificial smoke should have the effect of activating the device into an alarm state.

Once activated by either a signal from the control panel 102 or the testing apparatus 107, the connected fire alarm device 109 sends a device signal to the control panel 102, which generates event data based on the received device signal. The event data are then sent from the control panel 102 to the connected services server 120, which stores the event data in the connected services database 122.

In one embodiment, the event data are then sent from the connected services server 120 to the mobile computing device 110 to be displayed on the GUI 152. The inspector 108 then determines the result of the inspection based on the event data and inputs the results into the mobile computing device 110 via the GUI 152. The results are then sent back to the connected services server 120 and stored in the connected services database 122.

In another embodiment, the event data are processed by the connected services server 120, in which case the results of the inspection are determined automatically, sent back to the mobile computing device 110 and displayed on the GUI 152.

For non-network fire alarm devices 115, the inspector 108 obtains the device's identification via the identification mechanism 160. In one example, the inspector 108 scans a barcode using the mobile computing device 110, which translates the barcode into an identification code, for example. In another example, the inspector 108 reads an RFID tag using the mobile computing device 110 in order to generate the identification code. The inspection is then conducted by the inspector 108 and entered into the mobile computing device 110 via the GUI 152. The identification code and results are then sent to the connected services server 120, which uses the identification code to store the results in the connected services database 122 associated with the record for the non-network fire alarm device 115.

Figure 1B:
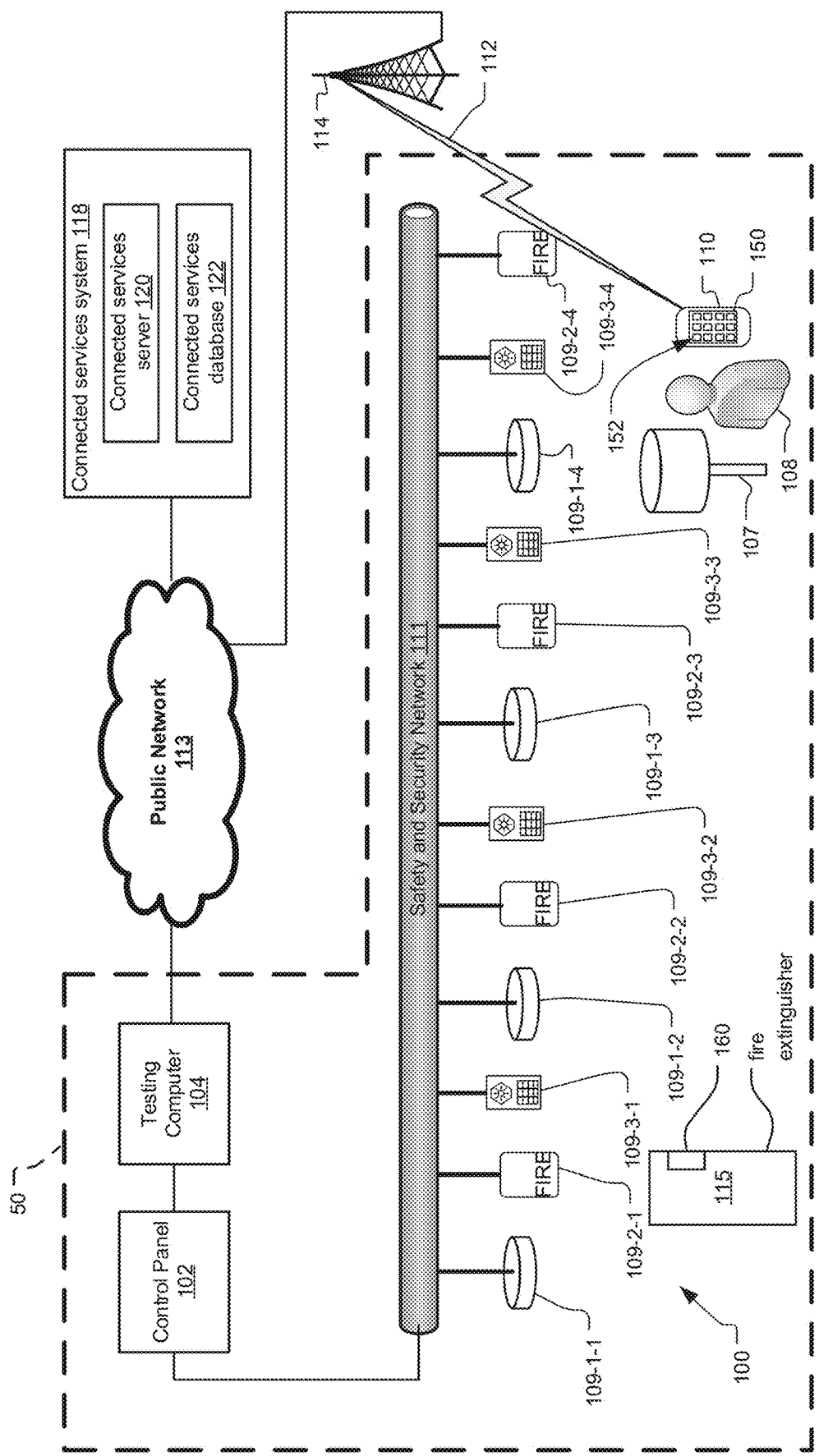
FIG. 1B is a block diagram illustrating an alternative embodiment of the fire alarm system, in which the control panel connects to a connected services system via a testing computer.

FIG. 1B is a block diagram illustrating an alternative embodiment of the fire alarm system 100. In this embodiment, the control panel 102 lacks network connectivity and is thus incapable of connecting directly with the connected services system 118. Instead, the control panel 102 communicates with the connected services system 118 via a testing computer 104. Device signal and event data are sent from the control panel 102 to the testing computer 104. The data are then sent from the testing computer 104 to the connected services system 118.

In the illustrated example, the control panel 102 is connected to the testing computer 104, which, in turn, is connected to the connected services system 118 via the public network 113. In an alternative embodiment (not illustrated), the testing computer 104 connects to the public network 113 via the cellular radio tower 114.

FIGS. 2A through 3G show a series of exemplary screens of the GUI 152 that are displayed on the touchscreen display 150 of the mobile computing device 110. In general, the information contained in the GUI 152 is retrieved from the connected services database 122 by the connected services server 120 and sent to the mobile computing device 110. Information is also input into the mobile computing device 110 via the GUI 152 and sent to the connected services server 120.

In particular, FIGS. 2A through 2G show examples of screens of the GUI 152 that are displayed during the process of inspecting fire alarm devices 109. In general, these screens include a testing pane 202 and a selection pane 204.

The testing pane 202 includes a visual indication (e.g. a list or a collection of icons) of which devices are currently being inspected. Also included in the testing pane 202 is text ("Active Elements") indicating how many or devices are currently indicated by the testing pane 202.

The selection pane 204 includes a visual indication of which devices need to be inspected. Also included is text ("Remaining Devices") indicating how many devices are indicated by the selection pane 204. Which fire alarm devices 109 are indicated by the selection pane is based on an inferred location of the inspector 108 or an inferred order of devices being tested, both of which are determined by the connected services server 120 based on information in the connected services database 122 or indoor location tracking information received from the mobile computing device 110, the order in which the devices were tested in a previous system test, among other examples. In one example, the selection pane 204 indicates only devices that are physically near the last inspected device. In another example, the selection pane 204 indicates devices based on the order of devices from previous inspections. In this way, the GUI 152 facilitates the navigation of the inspector 108 through the fire alarm system 100.

In general, during an inspection, the inspector 108 selects fire alarm devices 109 for inspection from the selection pane 204. The selected fire alarm device 109 is then indicated by the testing pane 202 as a device that is currently being inspected. The inspector 108 enters the results of the inspection into the testing pane 202, after which the selected fire alarm device 109 is no longer indicated by the selection pane 204.

Figure 2A:
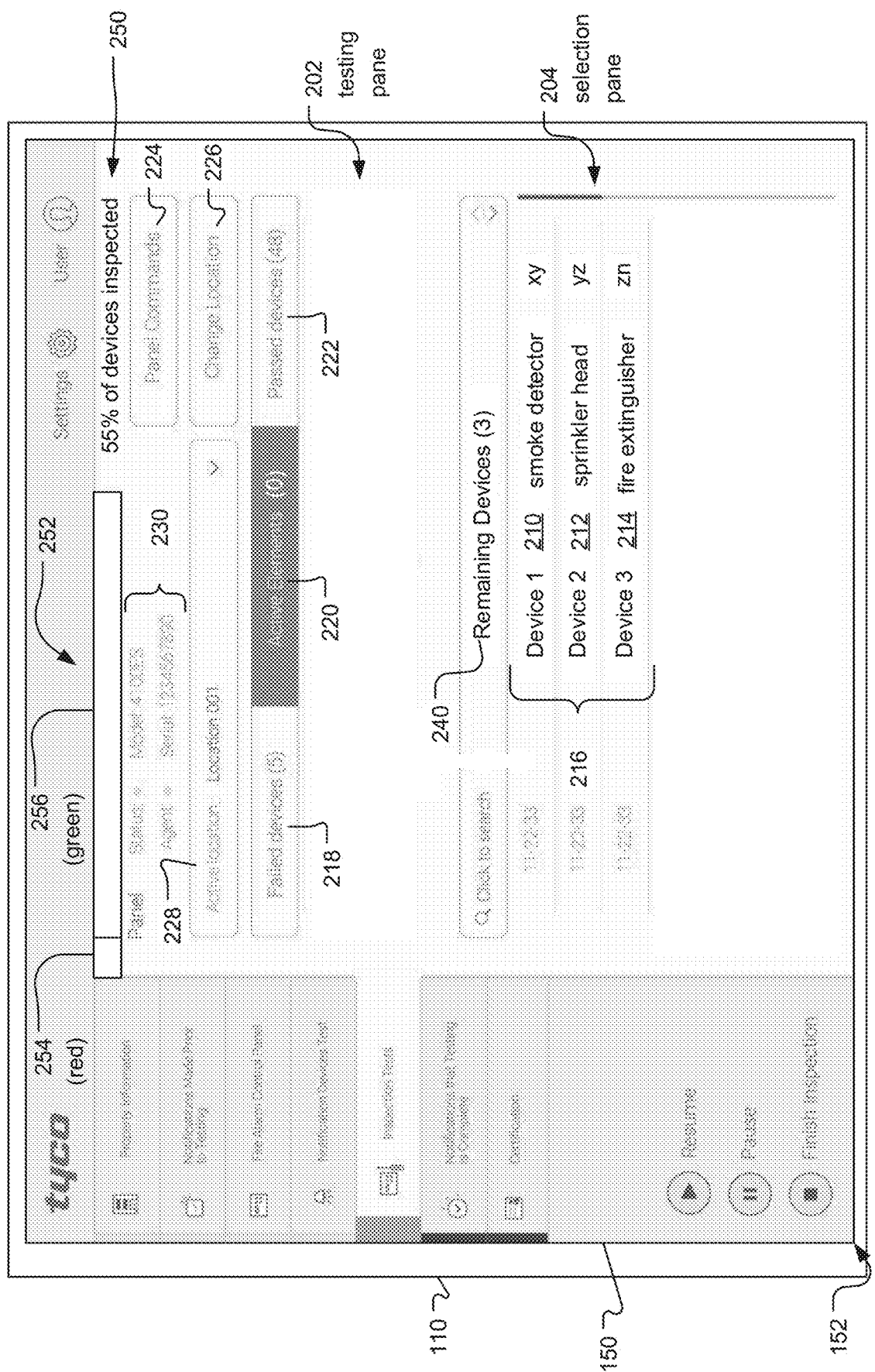
FIG. 2A shows an example of a screen of the graphical user interface (GUI) that is displayed on the touchscreen display of the mobile computing device during an inspection of fire alarm devices.

FIG. 2A shows an example of the screen of the GUI 152 during an inspection. In the illustrated example, no fire alarm devices 109 are indicated by the testing pane 202, and three devices (Device 1, Device 2, and Device 3) are indicated by the selection pane 204 as separated entries 210, 212, 214 of a list 216. Each of the entries further includes, moving left to right, a date on which the device was last tested "11-22-33," a type of the device (e.g., smoke detector, sprinkler head, fire extinguisher, and a model number the device.

Additional information and functions are shown on the screen in the GUI 152. For example, the number of failed devices in the current test is indicated in region 218. On the other hand, the number of passed devices in the current test is indicated in region 222. On the other hand, the number of devices currently being tested is indicated in region 220.

The current active location that is being tested is indicated in region 228. The location might correspond to a floor or region of a building. In other examples, the location corresponds to a specific loop of the control panel. This region can be changed by selection of graphical button 226. On the other hand, commands to the panel can be issued by selecting graphical button 224. Information concerning the panel is provided in region 230.

Information concerning the progress of the inspection is provided in region 250, including text indicating the percentage of devices to be inspected that have been inspected (which is indicated as "55%" in the illustrated example), and a graphical element, specifically a progress bar 252, comprising a failed devices segment 254 and a passed devices segment 256. The width of the progress bar 252, relative to the screen of the GUI 152, represents a ratio of devices that have been inspected to the total number of devices to be inspected, and as devices are inspected, the progress bar 252 increases in width. Within the progress bar, the failed devices segment 254 represents the number of inspected devices for which failing results were generated, and the passed devices segment 256 represents the number of inspected devices for which passing results were generated. The width of each segment 254, 256 corresponds to a proportion of failed devices to the total number of inspected devices and passed devices to the total number of inspected devices, respectively. In the illustrated example, the failed devices segment 254 is displayed in red, and the passed devices segment 256 is displayed in green.

Figure 2B:
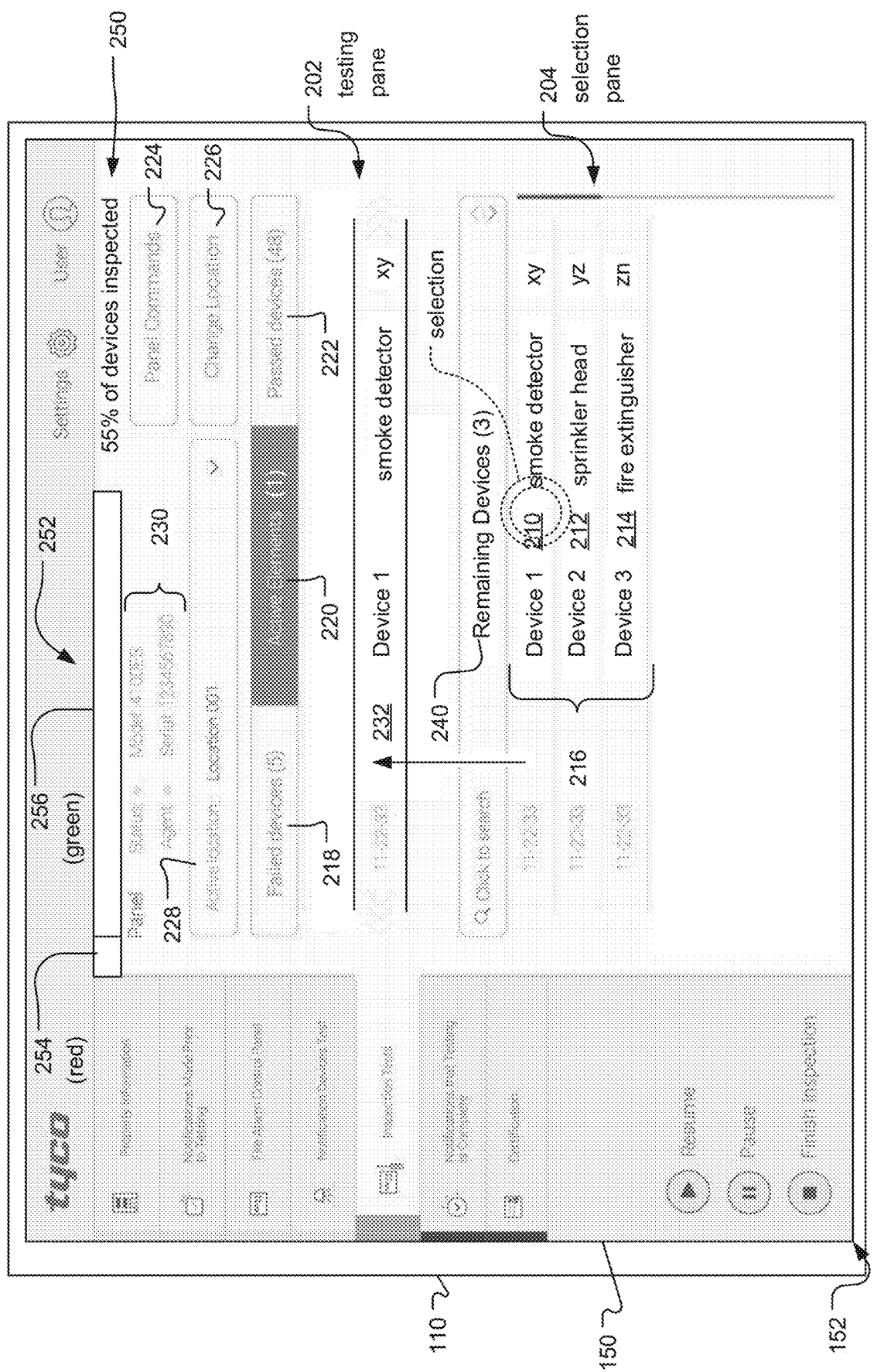
FIG. 2B shows an example of a screen of the GUI displayed in response to selecting a fire alarm device indicated by the selection pane.

FIG. 2B shows an example of the screen of the GUI 152 displayed in response to selecting a fire alarm device 109 indicated by the selection pane 204. In the illustrated example, Device 1 is selected. More specifically, contact with the region of the touchscreen display 150 containing a graphical representation 210 of the fire alarm device 109 named "Device 1" (in this case, an entry in a displayed list containing the device's name and other textual information about the device) is detected by the touchscreen display 150, indicating a selection of Device 1.

In response to the selection of Device 1, Device 1 is moved into the testing pane 202 and indicated as graphic entry 232. The number of active device or element in incremented in region 220.

The fire alarm device 109 associated with Device 1 is then tested using one of a variety of methods, including the methods previously described. In one example, the self test routine of the fire alarm device 109 is activated by the control panel 102. In another example, the fire alarm device 109 is activated manually by the inspector 108 using the testing apparatus 107. In both examples, upon activation of the fire alarm device 109, device signal and event data (such as analog values) are sent from the device to the control panel 102, from the control panel 102 to the connected services system 118, and from the connected services system 118 to the mobile computing device 110. The inspector 108 determines the results of the inspection based on the device signal and event data and inputs the result into the mobile computing device 110 via the testing pane 202 of the GUI 152.

The result of the inspection is indicated in response to the touchscreen display 150 detecting a gesture (e.g. a swipe of a finger or stylus).

Figure 2C:
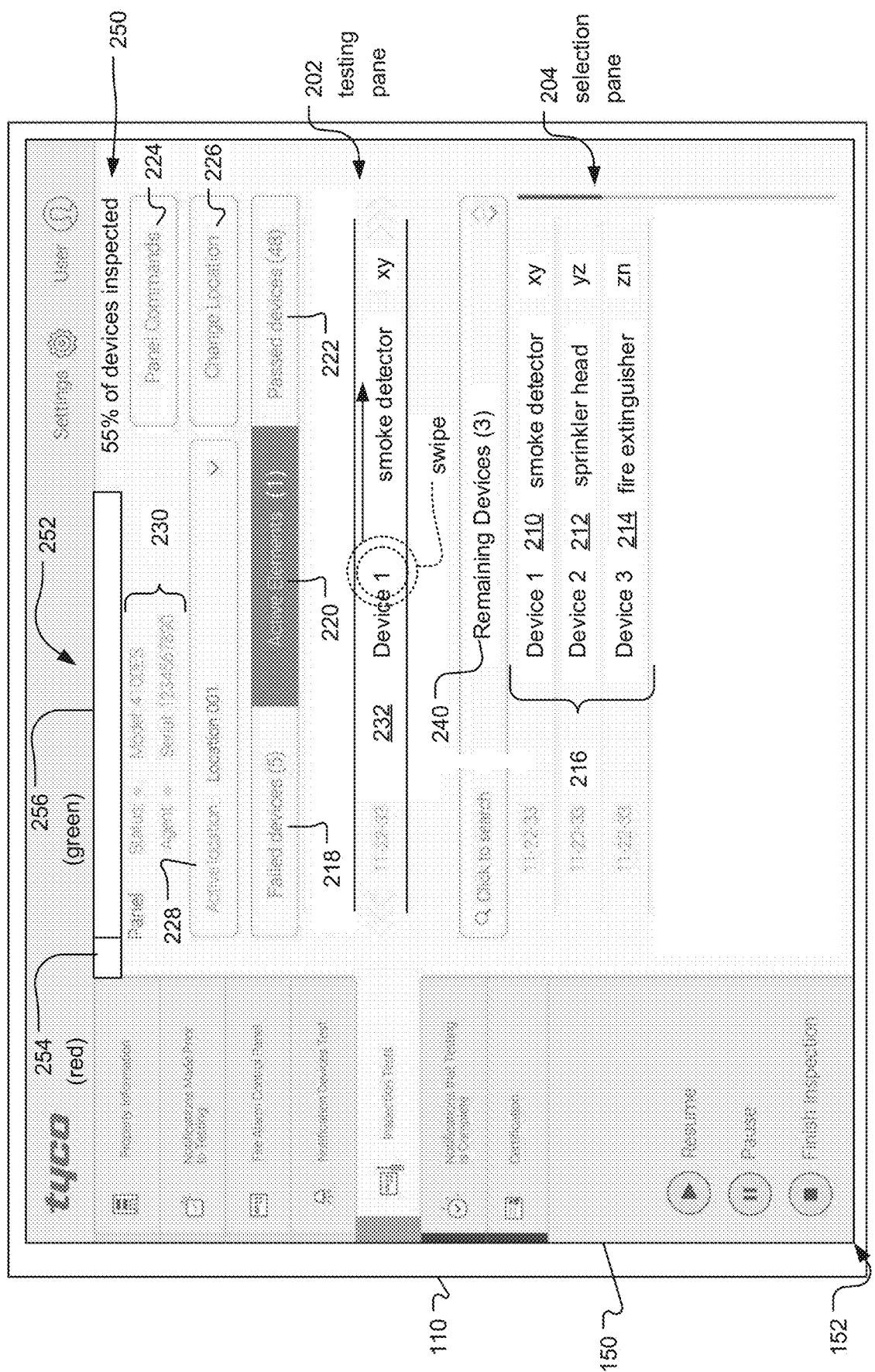
FIG. 2C shows an example of a screen of the GUI displayed at the beginning of a detected swipe gesture indicating the results of the inspection.

FIG. 2C shows the screen of the GUI 152 at the beginning of a detected swipe gesture for entry 232 indicating the results of the inspection. In the illustrated example, continuous contact with the touchscreen display 150 starting at a region containing a graphical representation 232 of the fire alarm device 109 named "Device 1" and moving toward the right is detected by the touchscreen display 150, indicating a passing result of the inspection of Device 1. A similar swipe gesture toward the left (not illustrated) would indicate a failing result of the inspection of Device 1.

Figure 2D:
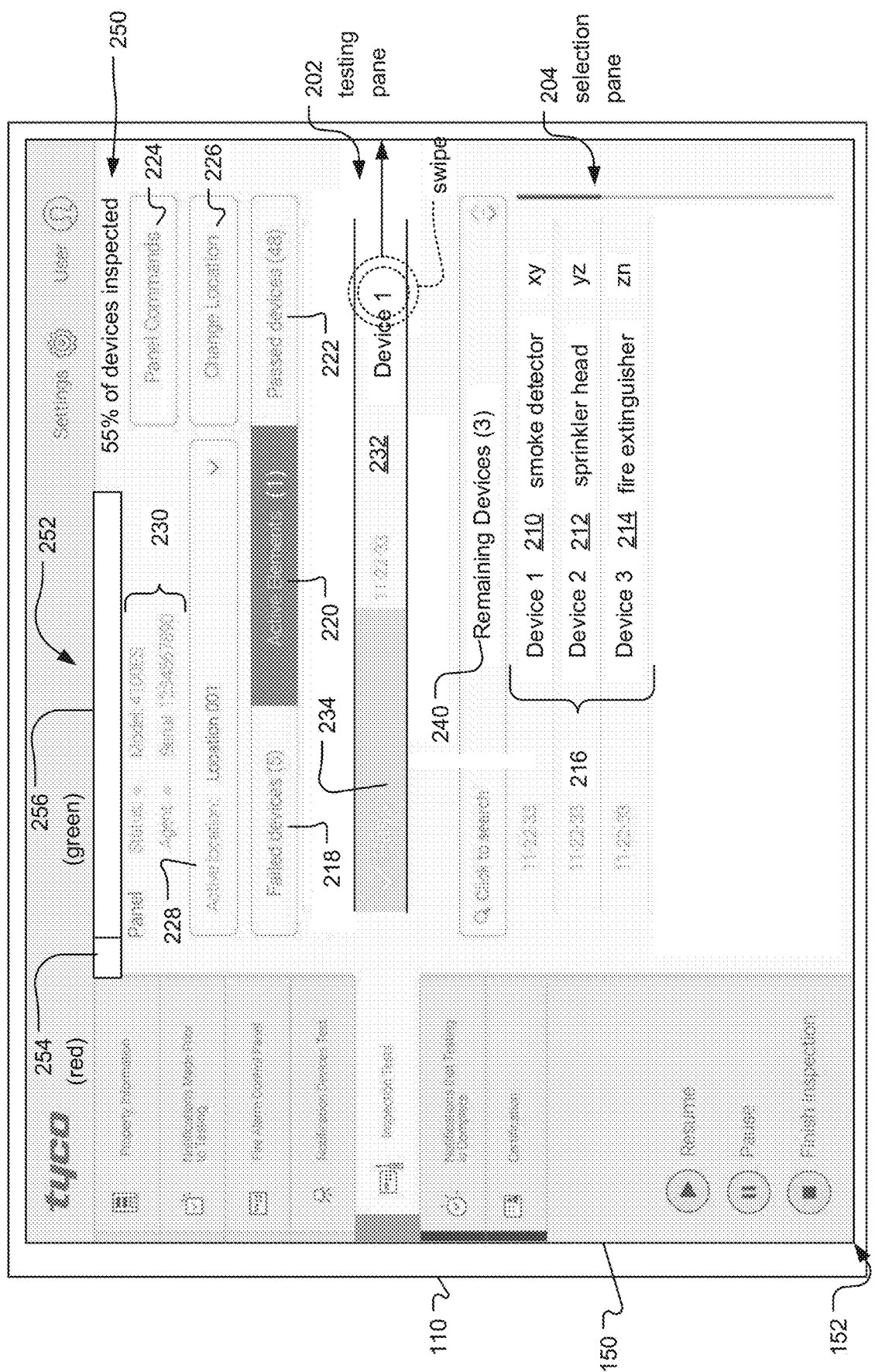
FIG. 2D shows an example of a screen of the GUI displayed in the middle of a detected swipe gesture indicating the results of the inspection.

FIG. 2D shows the screen of the GUI 152 in the middle of a detected swipe gesture indicating the results of the inspection for entry 232. In the illustrated example, the graphical representation of the fire alarm device 109 has moved toward the right by a distance corresponding to the movement of the region in which contact with the touchscreen display 150 is detected. As a result, the text "Device 1" is positioned more toward the right relative to the screen depicted in FIG. 2C and some of the text associated with Device 1 is no longer visible. Additionally, a graphical indication 234 of the results appears, and its size increases in proportion to the amount that the graphical representation 232 of the fire alarm device 109 has moved along with the swipe gesture. In this example, the graphical indication of the results is a colored bar (for example, green) with text indicating that the result is "Pass". In another example (not illustrated), the graphical indication of the results includes a red bar with text indicating that the result is "Fail". In this way, in general, in response to detecting the swiping gesture, the GUI 152 gives the appearance of the graphical representation of the fire alarm device 109 moving out of the visible portion of the screen and being replaced with a graphical indication of the results.

Figure 2E:
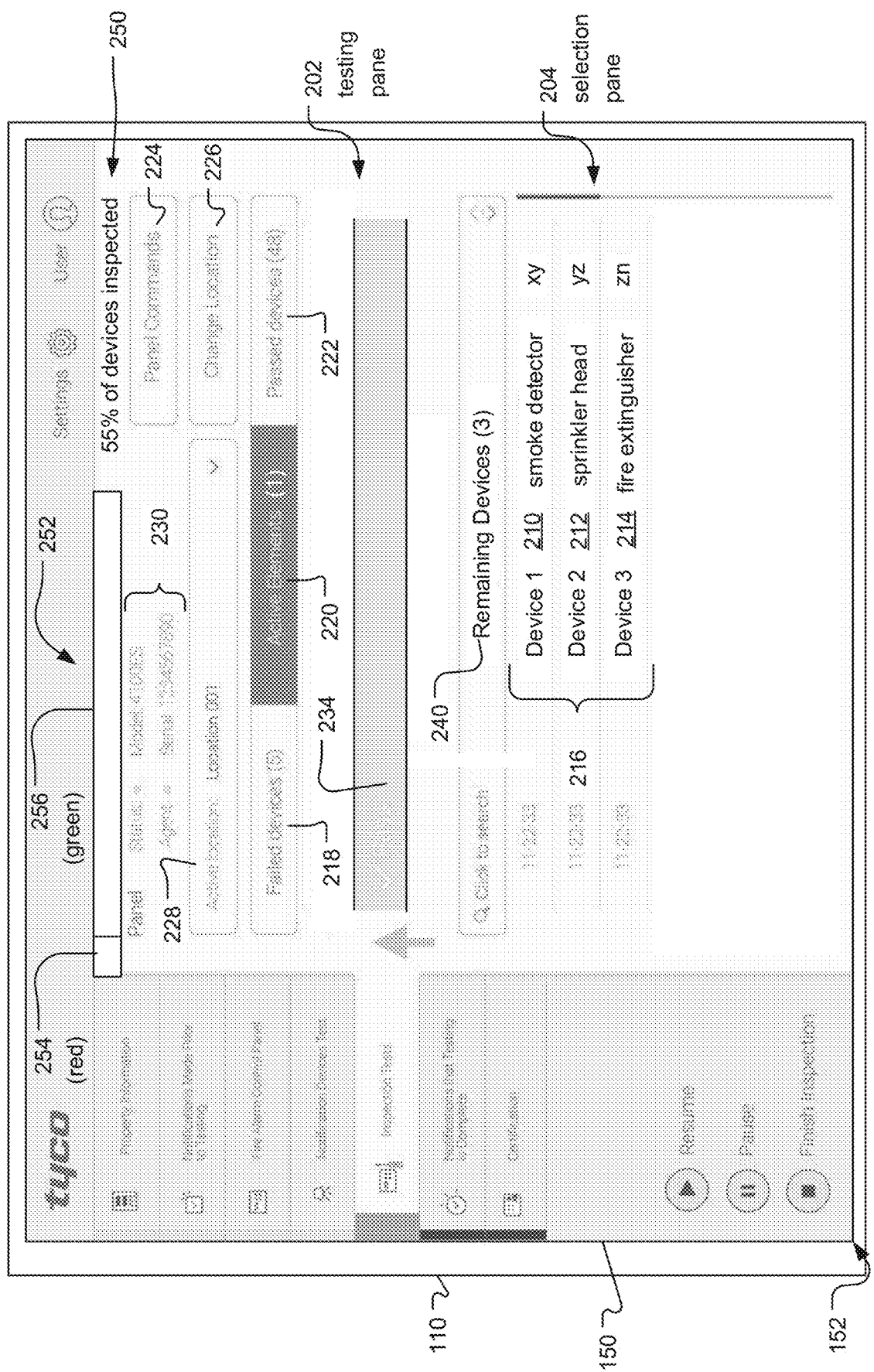
FIG. 2E shows an example of a screen of the GUI displayed at the end of a detected swipe gesture indicating the results of the inspection.

FIG. 2E shows the screen of the GUI 152 at the end of a detected swipe gesture indicating the results of the inspection. In the illustrated example, the graphical indication of the result of the inspection 234 is now displayed in place of the graphical representation of the fire alarm device 109, which, in turn, is no longer displayed.

At least some portion of the graphical indication of the result of the inspection 234 remains displayed on the screen for a predetermined period of time. In response to detecting contact during this predetermined period of time with the touchscreen display 150 in the region in which the graphical indication of the result is displayed, cancellation of the selection of the results of the inspection is indicated. As a result, the fire alarm device 109 for which the result was previously selected returns to being indicated by the testing pane 202 as before, and the previously selected result is not sent to the connected services system 118. During this predetermined period of time in which cancellation of the results selection may be indicated, the GUI 152 displays a gradually decreasing portion of the graphical indication of the result 234 in which the size of the portion of the graphical indication of the result corresponds to how much of the predetermined period of time has elapsed. In this way, the graphical indication of the result 234 appears to shrink until it disappears, during which time the inspector 108 can cancel the result selection by selecting the graphical indication 234.

Figure 2F:
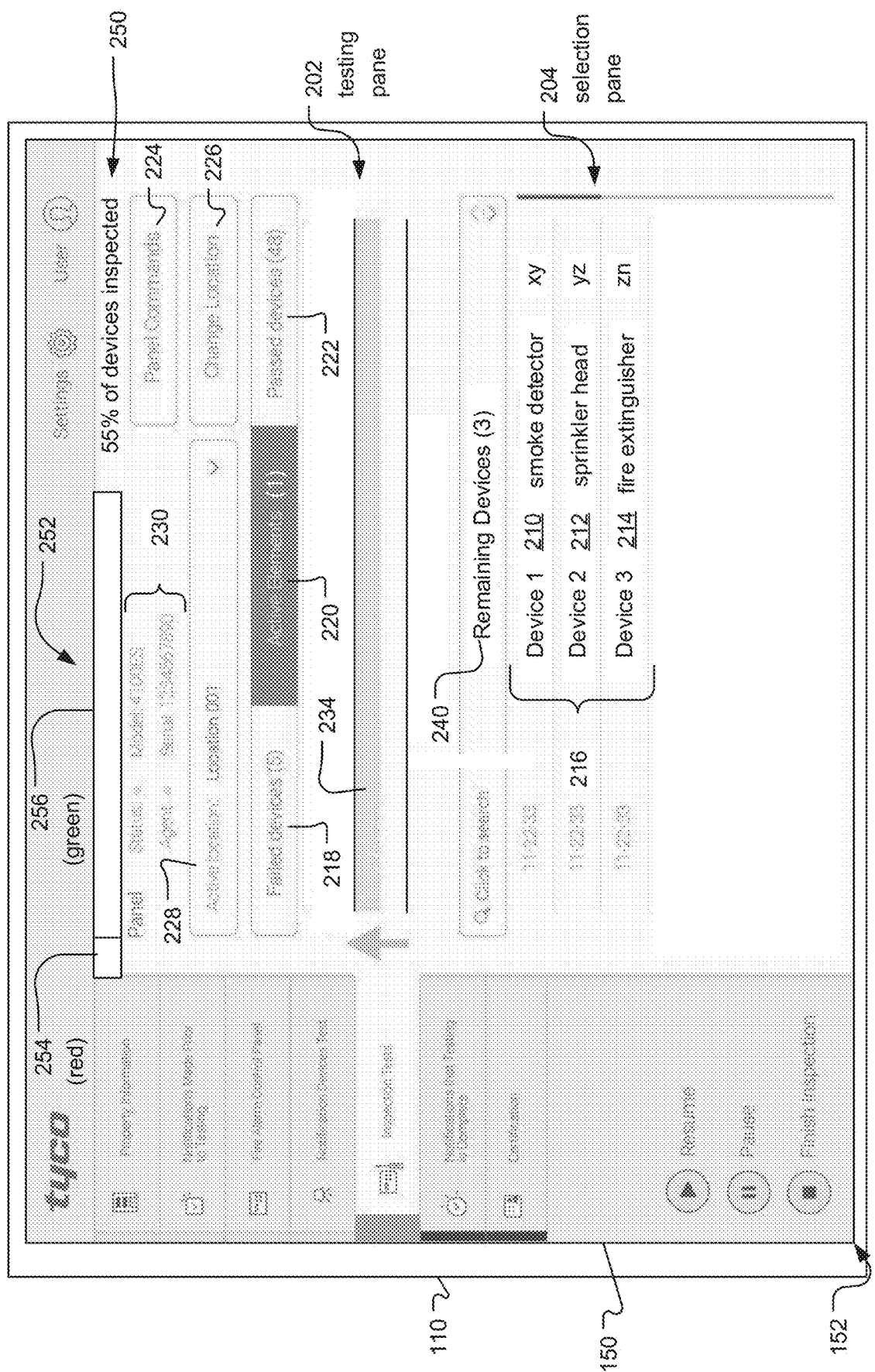
FIG. 2F shows an example of a screen of the GUI displayed in the middle of a predetermined period of time during which cancellation of the selection of the result of the inspection is possible.

FIG. 2F shows the screen of the GUI 152 in the middle of the predetermined period of time during which cancellation of the result selection is possible. In the illustrated example, the graphical indication of the result 234 vertically spans only half of the region containing the graphical representation in comparison to the graphical indication of the result depicted in FIG. 2E. As a result of the change in size, the graphical indication of the result 234 appears to disappear gradually from the testing pane 202, starting from the bottom.

Figure 2G:
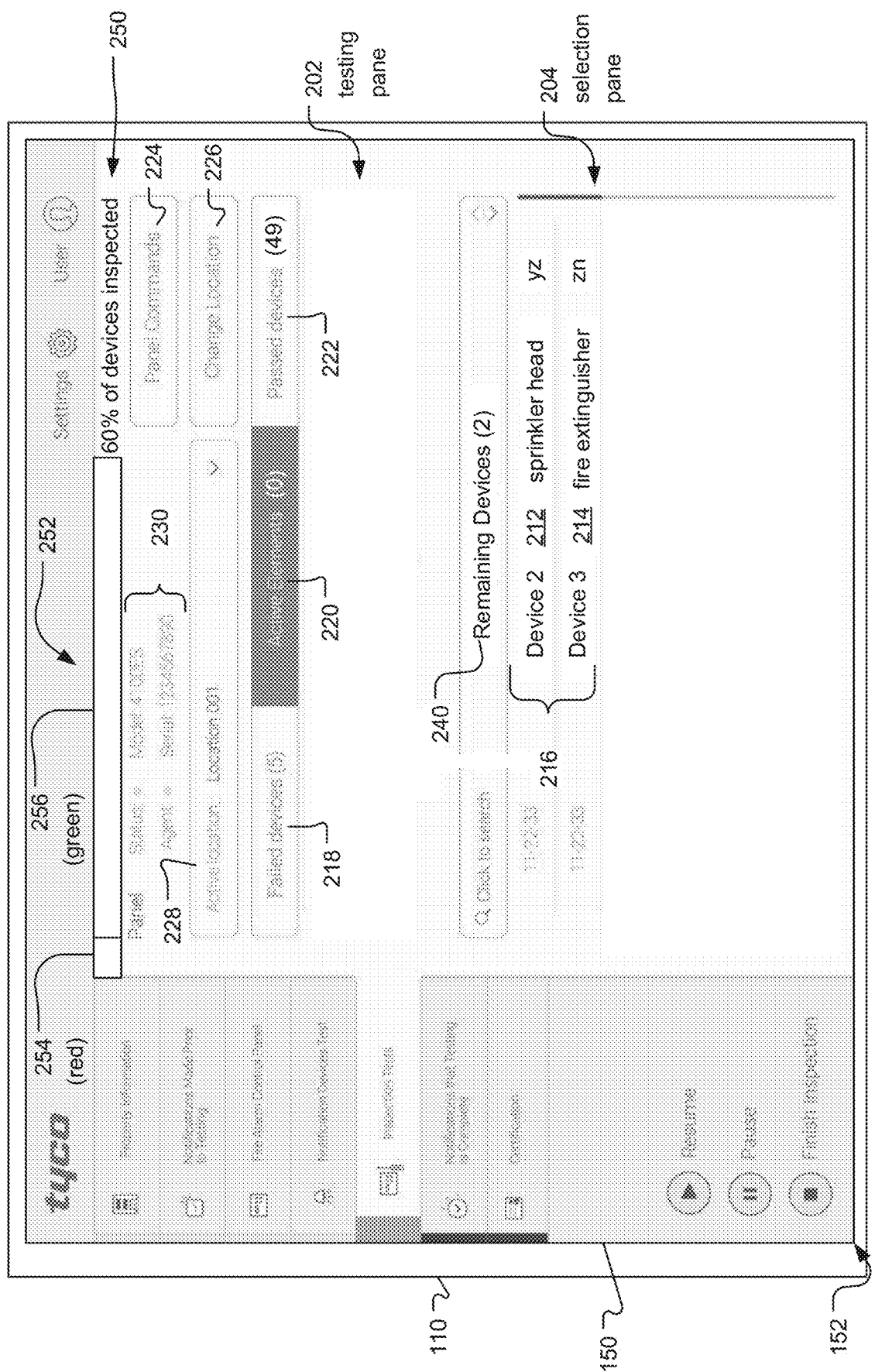
FIG. 2G shows an example of a screen of the GUI displayed after the selection of the result of the inspection has been completed.

FIG. 2G shows the screen of the GUI 152 after the results selection has been completed. In the illustrated example, the fire alarm device 109 named "Device 1" is no longer indicated by either the testing pane 202 or the selection pane 204, as the graphical representation of that fire alarm device 109 no longer appears in either pane. The number of "Active Elements" is displayed as "0" in region 220, and the number of "Remaining Devices" has changed to "2" in region 240. Devices 2 and 3 remain listed in the selection pane 204. The number of passed device indicated in region 222 has been incremented to "49."

Additionally, the width of the progress bar 252 has increased relative to the width of the GUI screen 152, indicating that the total number of inspected devices has increased. Accordingly, the text indicating the percentage of devices to be inspected that have been inspected has changed from "55%" to "60%", and the passed devices segment 256 of the progress bar 252 takes up a larger proportion of the total width of the progress bar 252.

FIGS. 3A through 3G show examples of screens of the GUI 152 that are displayed during the process of inspecting the control panel 102. In general, these screens include a control panel testing pane 302.

Figure 3A:
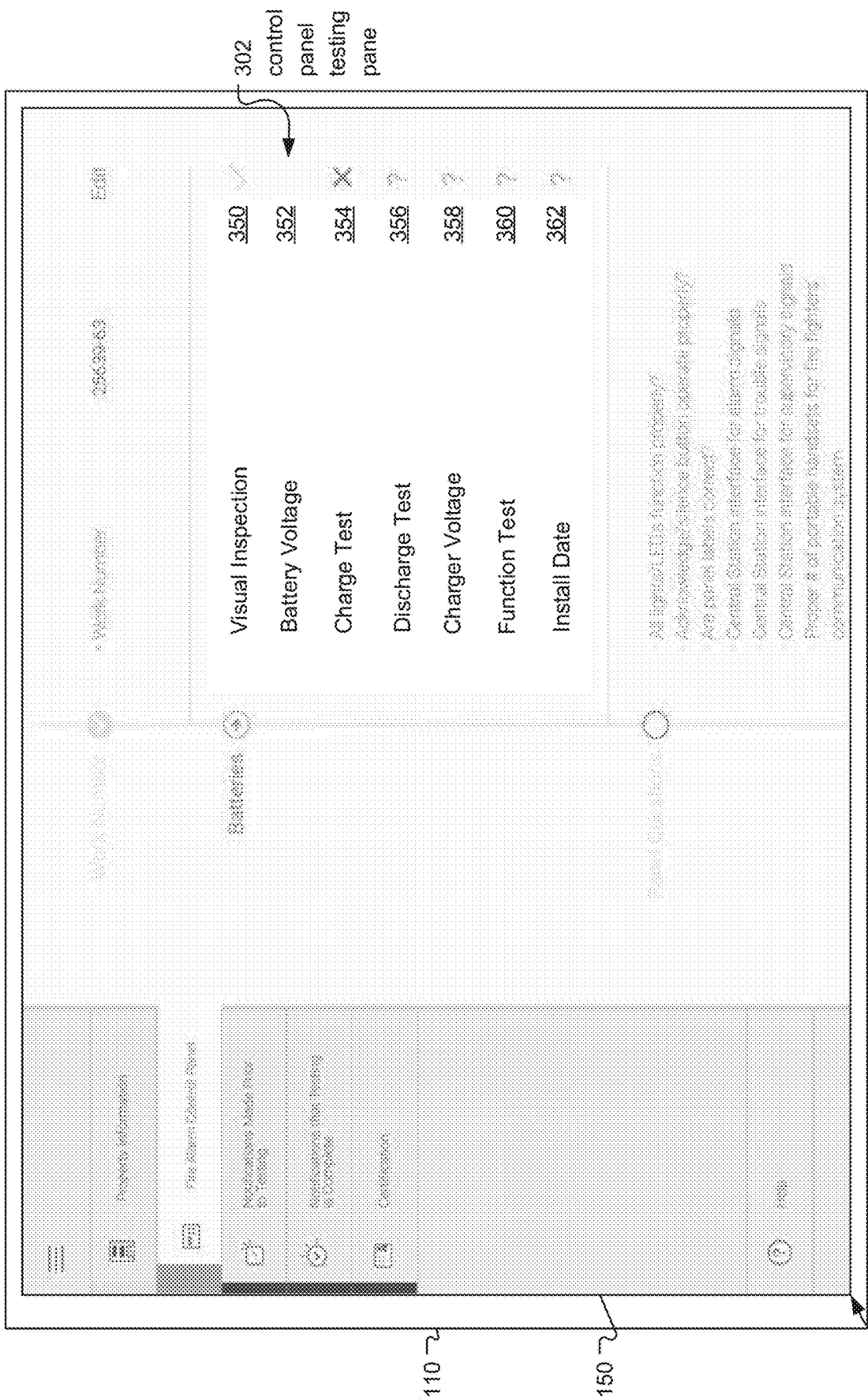
FIG. 3A shows an example of a screen of the GUI displayed during an inspection of the control panel.

FIG. 3A shows an example of the screen of the GUI 152 during an inspection of the control panel. In the illustrated example, the control panel testing pane 302 includes a selectable menu providing a variety of types of tests of the control panel 302 that can be selected by the inspector 108. The menu includes graphical representations of types of tests, each of which includes a name and a status icon indicating whether the status of the test is passing, failing or unknown. The types of tests of the control panel 102 listed in the control panel testing pane 302 include "Visual Inspection" 350, "Battery Voltage" 352, "Charge Test" 354, "Discharge Test" 356, "Charger Voltage" 358, "Function Test" 360, and "Install Date" 362. Results for the tests of the control panel 102 are selected in the same manner as results for the fire alarm device 109 inspections: a swipe gesture is detected, either toward the right to indicate a passing result or toward the left to indicate a failing result in each one of the respective regions 350, 352, 354, 356 358, 360, 362.

Figure 3B:
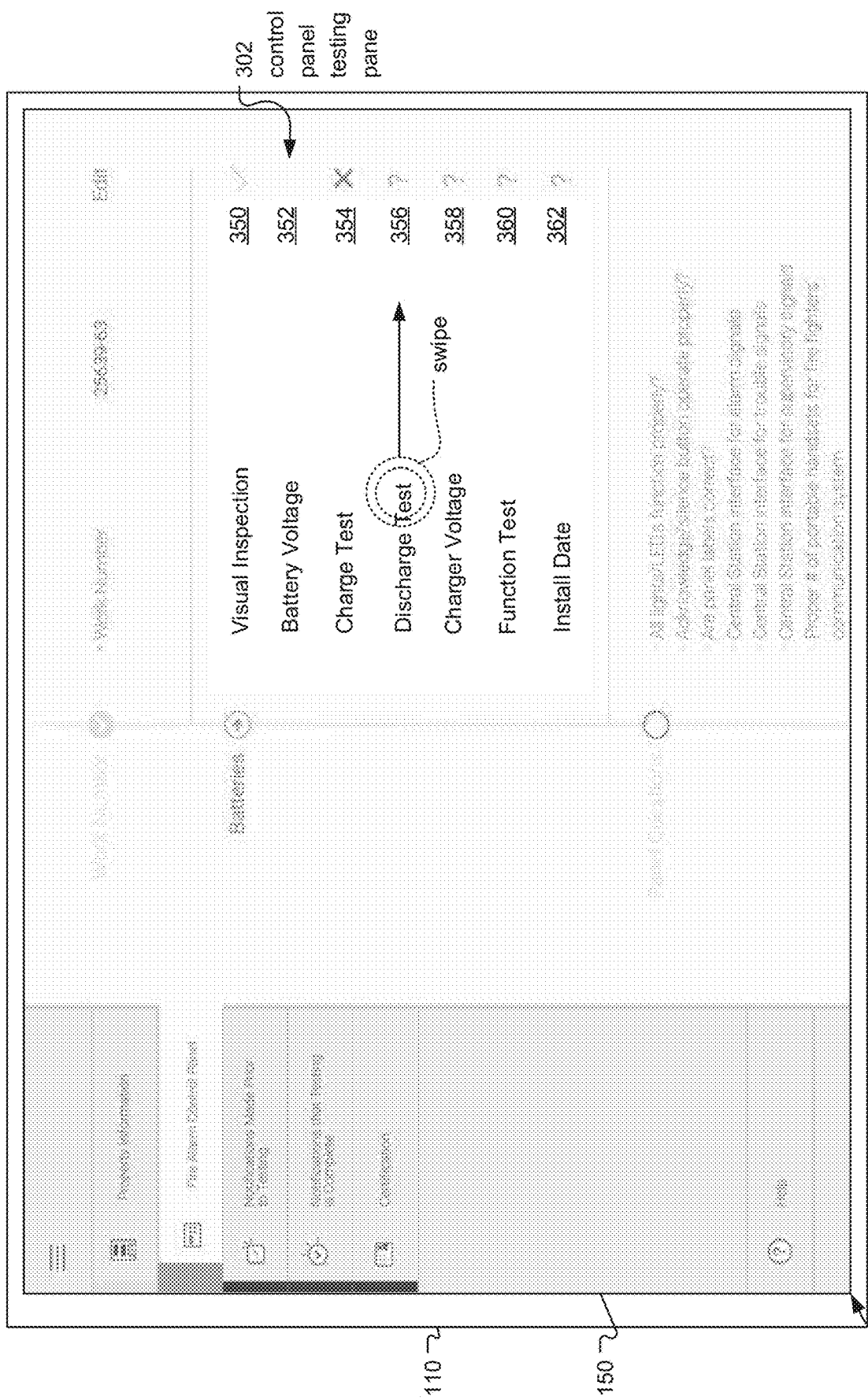
FIG. 3B shows an example of a screen of the GUI displayed at the beginning of a detected swipe gesture indicating a passing result of the inspection of the control panel.

FIG. 3B shows the screen of the GUI 152 at the beginning of a detected swipe gesture indicating a passing result of the inspection of the control panel 102 in region 356. In the illustrated example, continuous contact with the touchscreen display 150 starting at the region containing the graphical representation of the "Discharge Test" and moving toward the right is detected by the touchscreen display 150, indicating a passing result of the "Discharge Test" of the control panel 102.

Figure 3C:
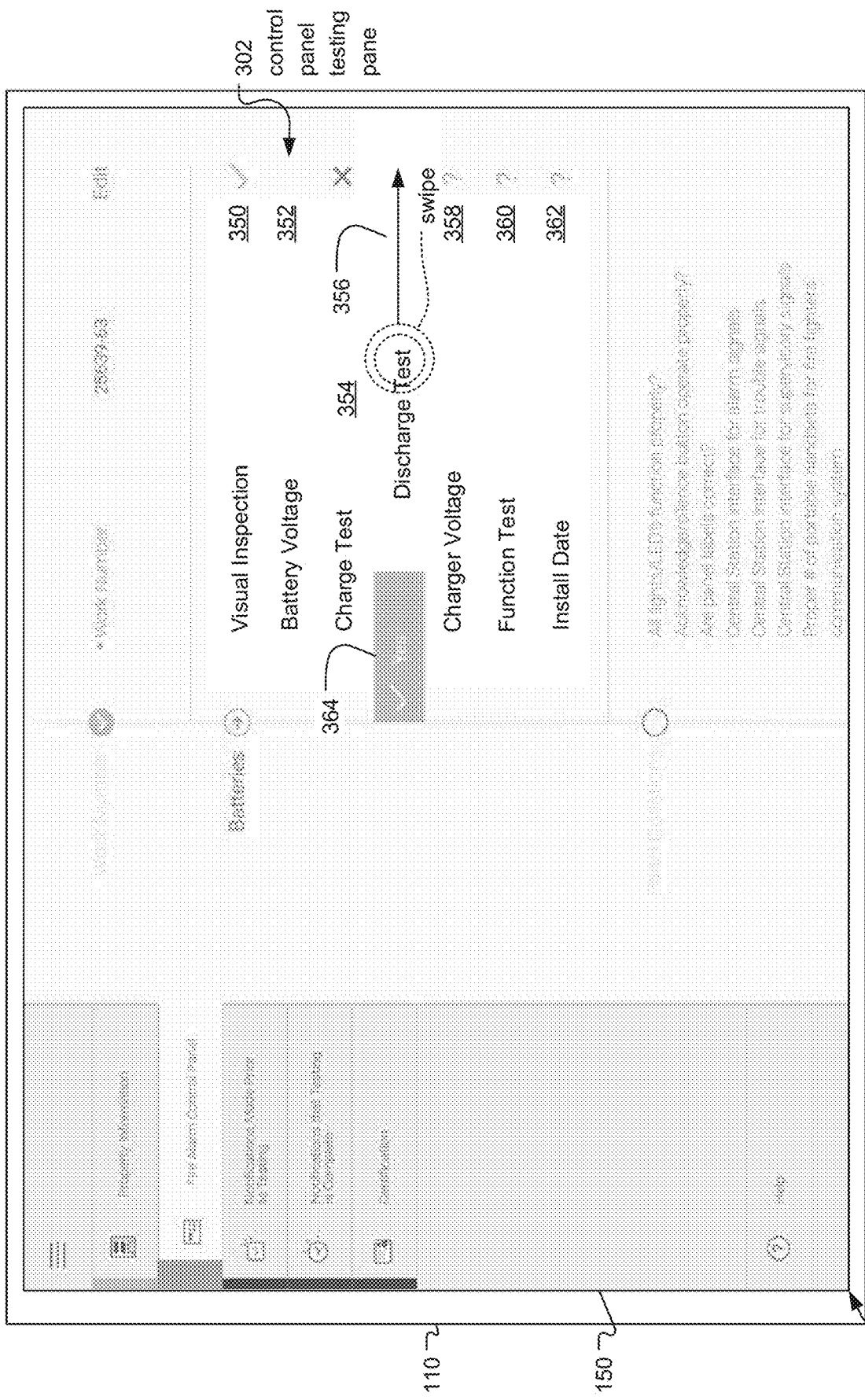
FIG. 3C shows an example of a screen of the GUI displayed in the middle of a detected swipe gesture indicating a passing result of the inspection of the control panel.

FIG. 3C shows the screen of the GUI 152 in the middle of a detected swipe gesture indicating a passing result of an inspection of the control panel 102. In the illustrated example, the graphical representation of the "Discharge Test" has moved toward the right by a distance corresponding to the movement of the region in which contact with the touchscreen display 150 is detected. As a result, the text "Discharge Test" is positioned more toward the right relative to the screen depicted in FIG. 3B and the status icon is no longer visible in region 356. Additionally, a graphical indication of the results 364 appears, and its size increases in proportion to the amount that the graphical representation of the "Discharge Test" has moved along with the swipe gesture. As in the previous example, in this example, the graphical indication of the results 364 is a colored bar (for example, green) with text indicating that the result is passing. In this way, in general, in response to detecting the swiping gesture, the GUI 152 gives the appearance of the graphical representation of the "Discharge Test" 356 moving out of the visible portion of the screen and being replaced with a graphical indication of the results 364.

Figure 3D:
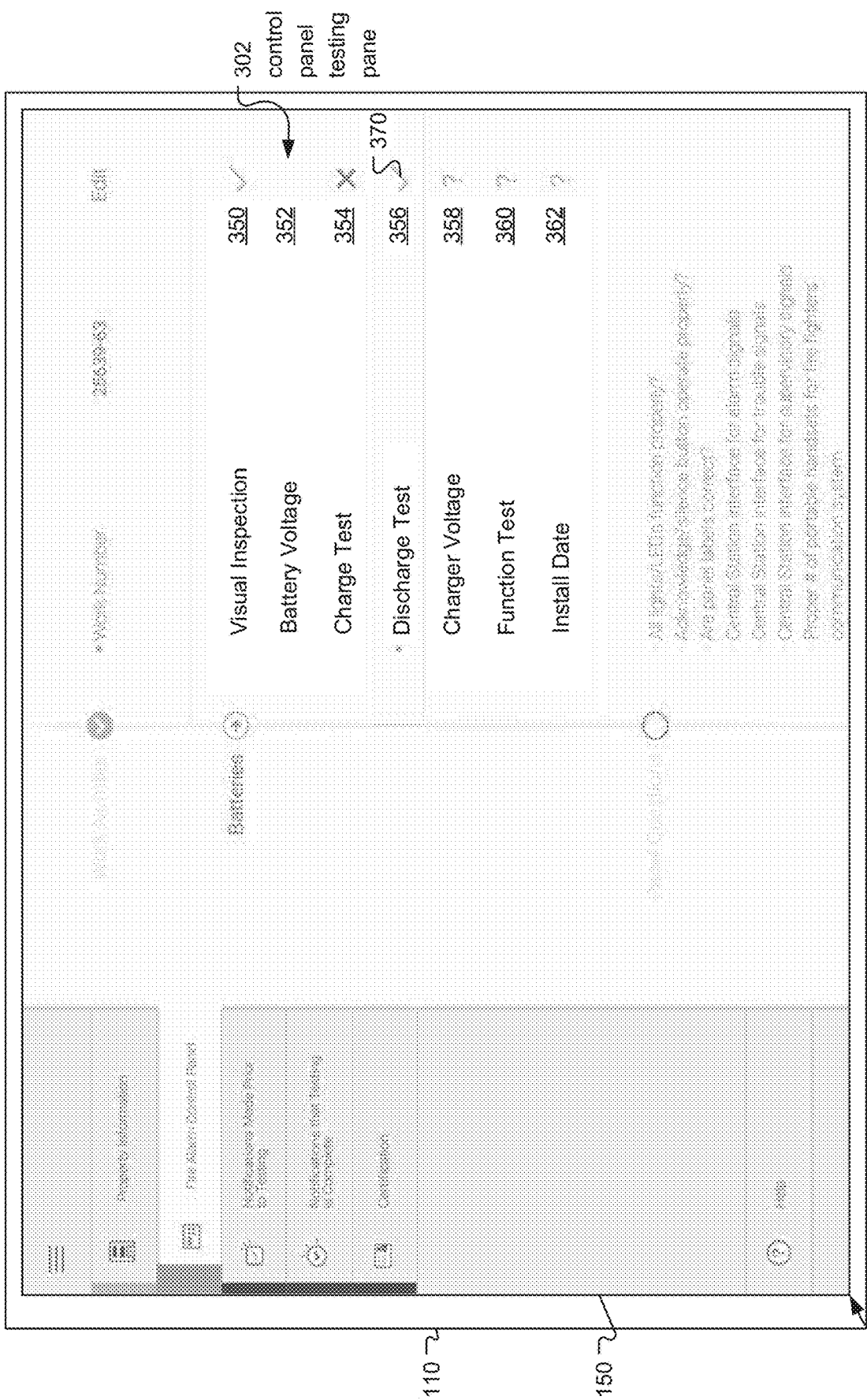
FIG. 3D shows an example of a screen of the GUI displayed at the end of a detected swipe gesture indicating a passing result of the inspection of the control panel.

FIG. 3D shows the screen of the GUI 152 at the end of a detected swipe gesture indicating a passing result of an inspection of the control panel 102 in region 356. In the illustrated example, the graphical representation of the "Discharge Test" now includes a status icon 370 indicating that the result of the test is passing.

Figure 3E:
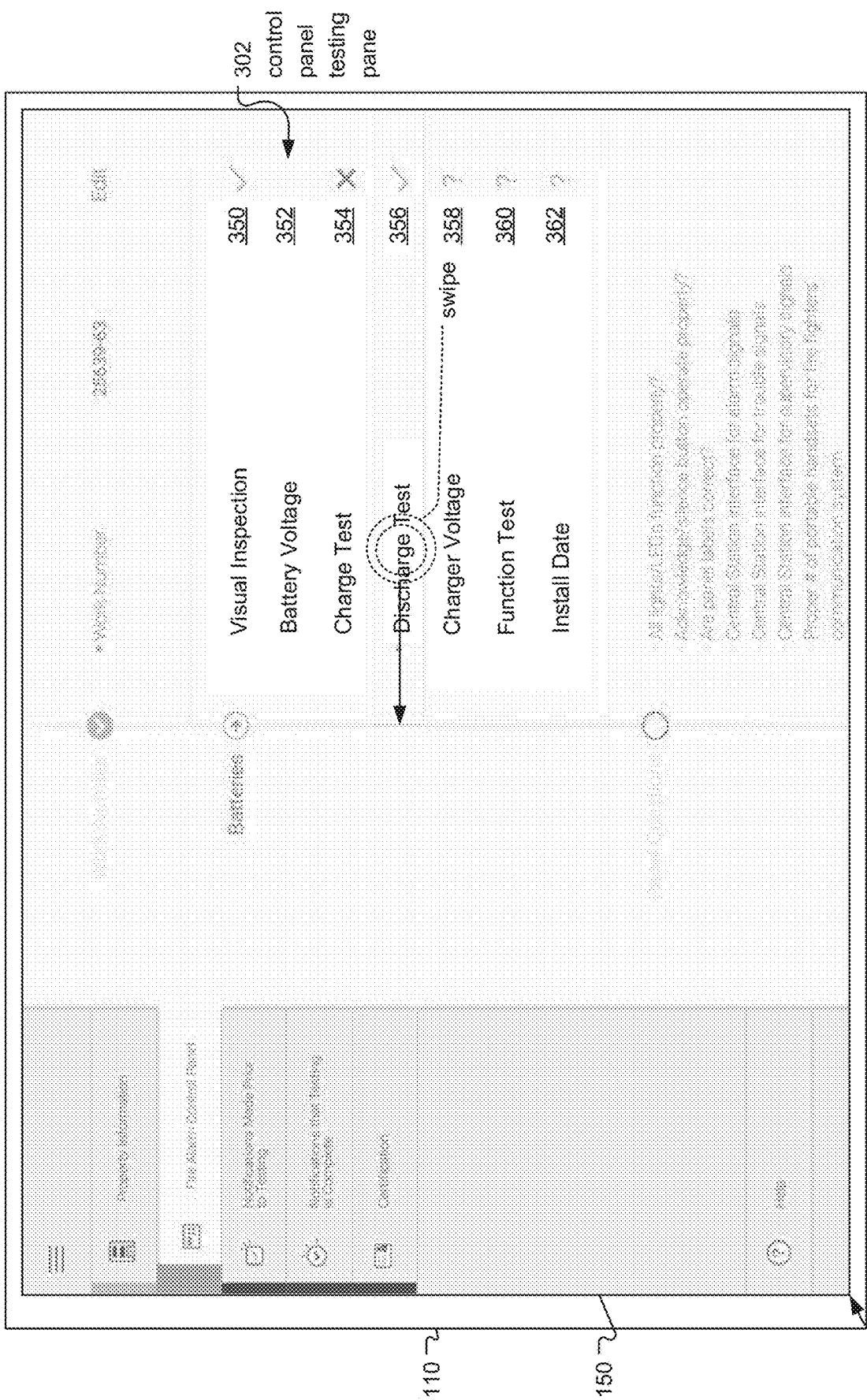
FIG. 3E shows an example of a screen of the GUI displayed at the beginning of a detected swipe gesture indicating a failing result of the inspection of the control panel.

FIG. 3E shows the screen of the GUI 152 at the beginning of a detected swipe gesture indicating a failing result of the inspection of the control panel 102. In the illustrated example, continuous contact with the touchscreen display 150 starting at the region containing the graphical representation of the "Discharge Test" 356 and moving toward the left is detected by the touchscreen display 150, indicating a failing result of the "Discharge Test" of the control panel 102.

Figure 3F:
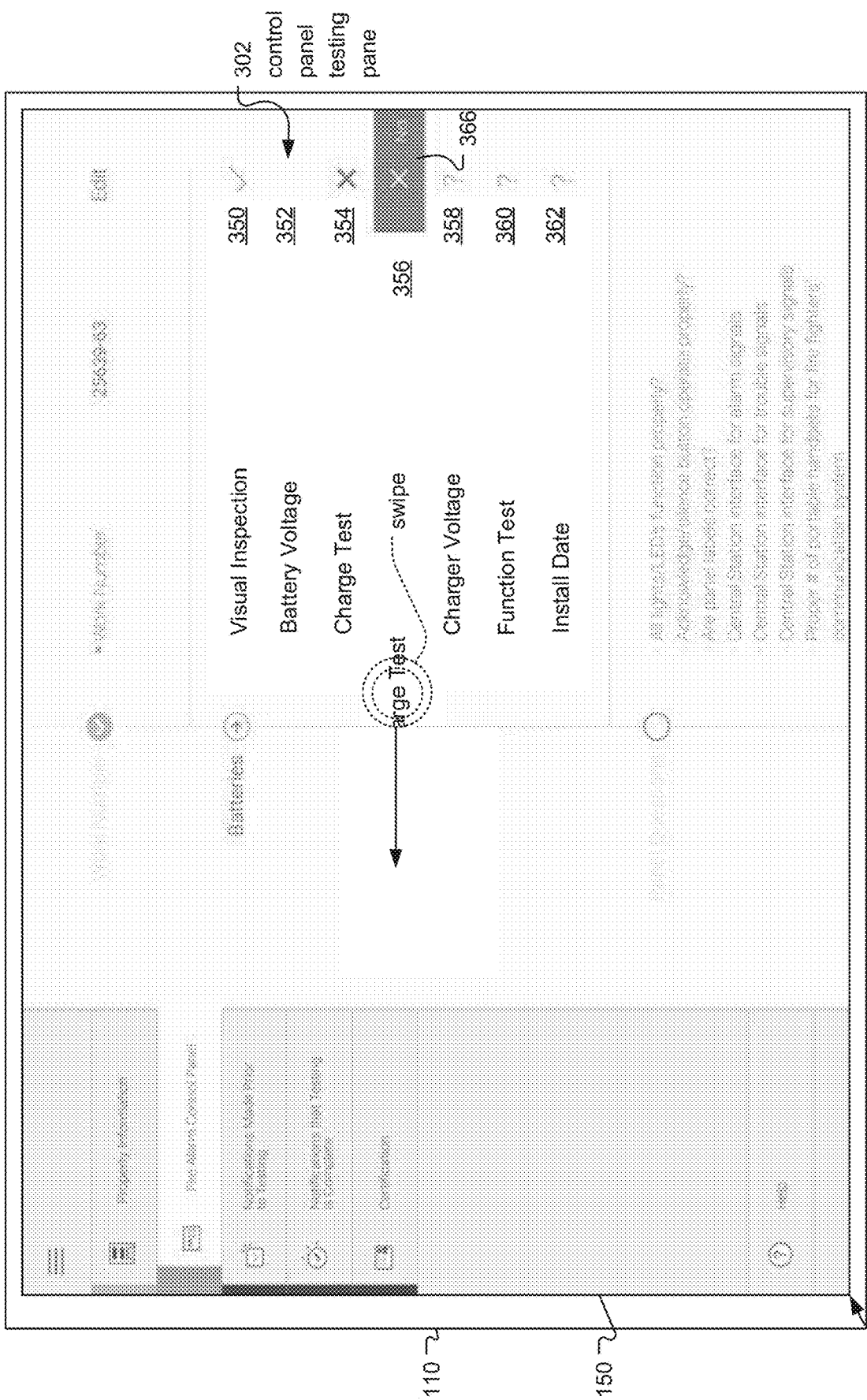
FIG. 3F shows an example of a screen of the GUI displayed in the middle of a detected swipe gesture indicating a failing result of the inspection of the control panel.

FIG. 3F shows the screen of the GUI 152 in the middle of a detected swipe gesture indicating a failing result of an inspection of the control panel 102. In the illustrated example, the graphical representation of the "Discharge Test" 356 has moved toward the left by a distance corresponding to the movement of the region in which contact with the touchscreen display 150 is detected. As a result, the text "Discharge Test" is positioned more toward the left relative to the screen depicted in FIG. 3E and the status icon is no longer visible. Additionally, a graphical indication of the results 366 appears, and its size increases in proportion to the amount that the graphical representation of the "Discharge Test" has moved along with the swipe gesture. In this example, the graphical indication of the results 366 is a colored bar (for example, red) with text indicating that the result is failing.

Figure 3G:
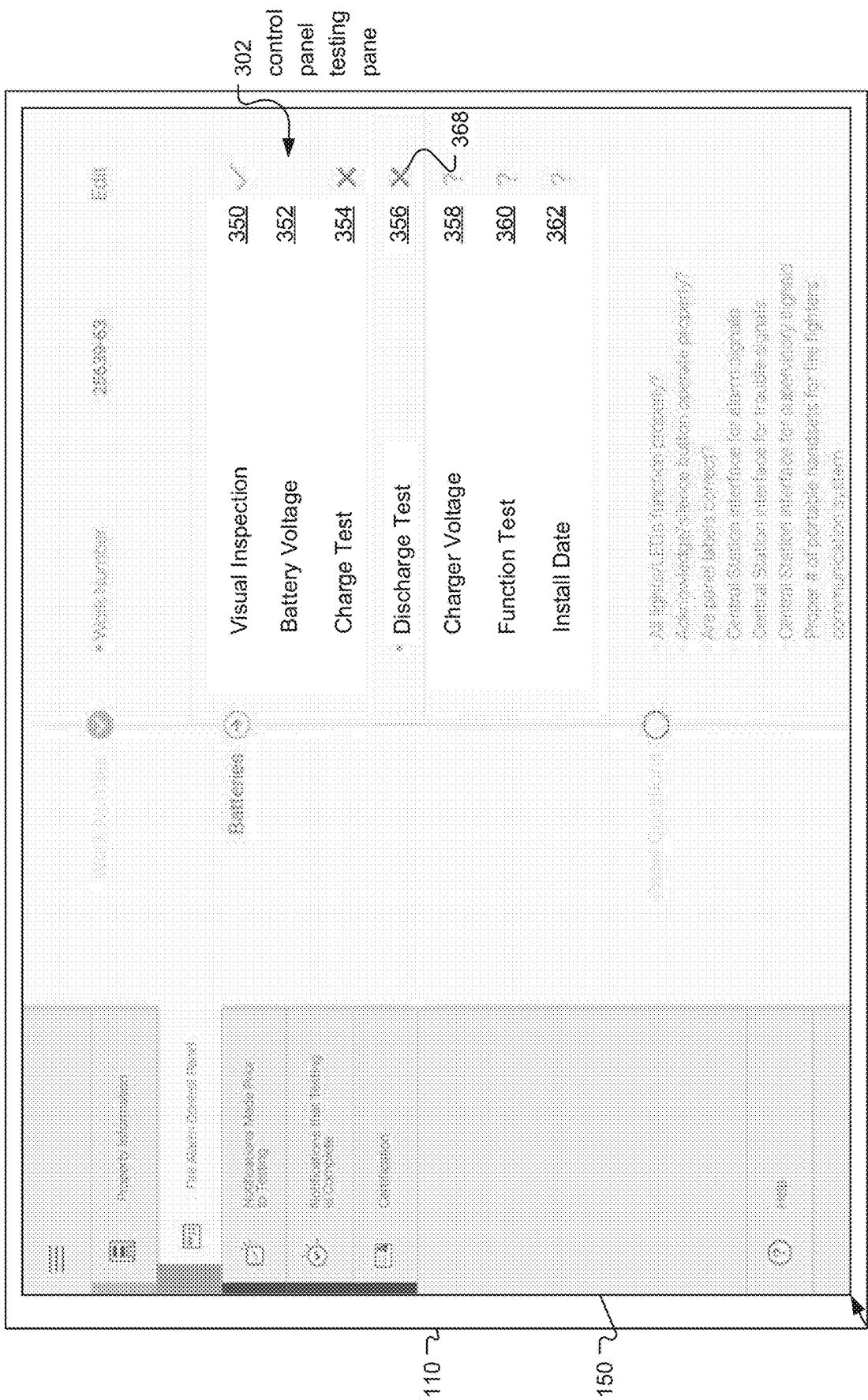
FIG. 3G shows an example of a screen of the GUI displayed at the end of a detected swipe gesture indicating a failing result of the inspection of the control panel.

FIG. 3G shows the screen of the GUI 152 at the end of a detected swipe gesture indicating a failing result of an inspection of the control panel 102. In the illustrated example, the graphical representation of the "Discharge Test" now includes a status icon 368 indicating that the result of the test is failing.

Figure 4A:
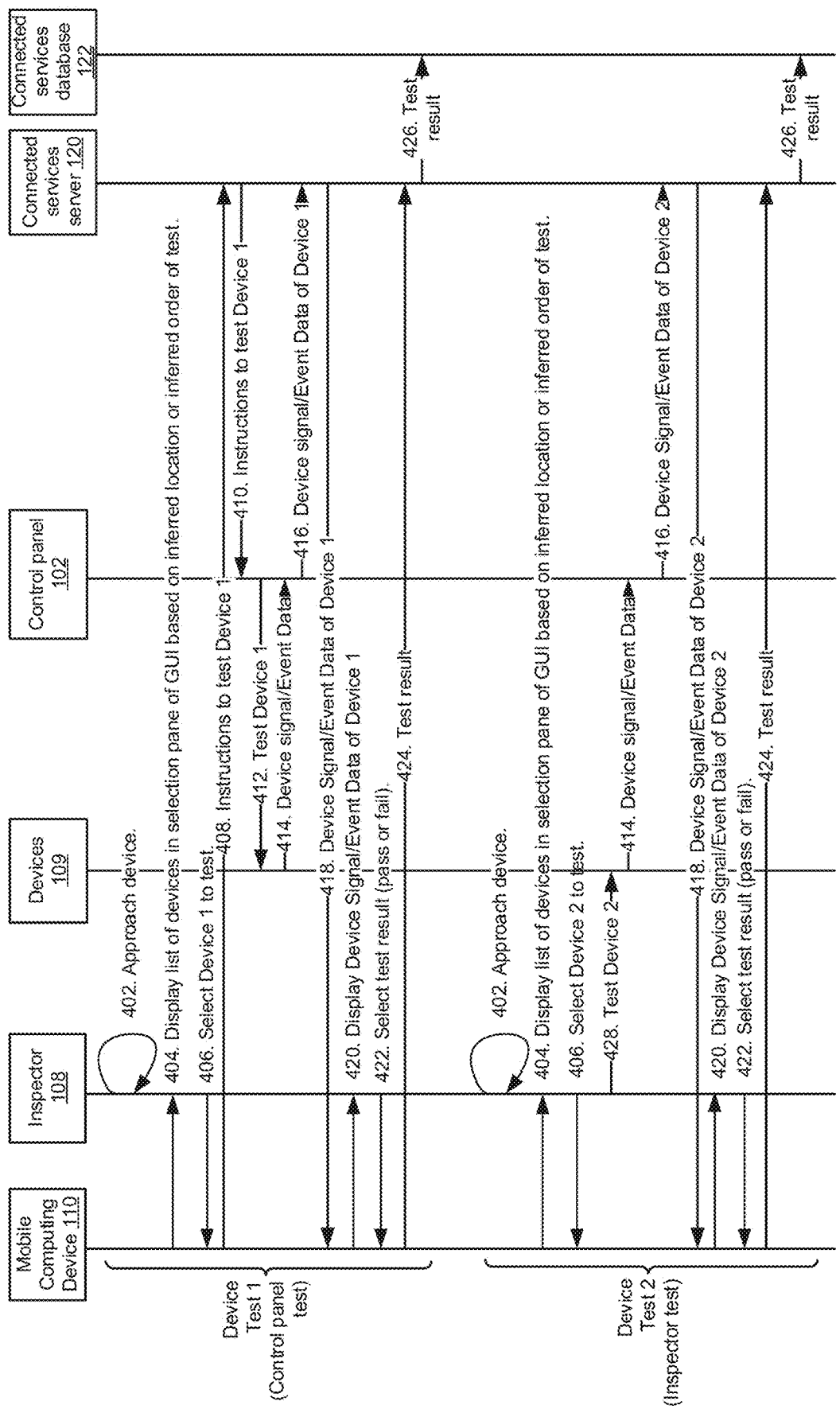
FIG. 4A is a sequence diagram illustrating how the connected fire alarm devices, control panel, mobile computing device, inspector, connected services server and connected services database interact during two exemplary inspections.

FIG. 4A is a sequence diagram illustrating how the connected fire alarm devices 109, control panel 102, mobile computing device 110, inspector 108, connected services server 120 and connected services database 122 interact during two exemplary inspections.

The first example deals with an inspection of Device 1, which is an exemplary connected fire alarm device 109. In this example, the fire alarm device 109 is activated by the control panel 102 during the inspection.

First, in step 402, the inspector 108 approaches Device 1. In step 404, a set of fire alarm devices 109 is indicated by the selection pane 204 of the GUI 152. The set of fire alarm devices 109 indicated by the selection pane 204 is based on the inferred location of the inspector 108 or the inferred order of test.

Next, in step 406, the inspector selects Device 1 in the selection pane 204 using the GUI 152 of the mobile computing device 110. In step 408, instructions to test Device 1 are then sent from the mobile computing device 110 to the connected services server 120. In response, the connected services server 120 sends instructions to test Device 1 to the control panel 102 in step 410.

In step 412, the control panel 102 tests Device 1 by activating it. Device signal and event data are then sent from Device 1 to the control panel 102 in step 414. The device signal and event data are sent from the control panel 102 to the connected services server 120 in step 416, and from the connected services server 120 to the mobile computing device 110 in step 418.

In step 420, the device signal and event data for Device 1 are displayed by the mobile computing device 110, and the inspector 108 determines whether the result is passing or failing. In step 422, the inspector 108 makes a selection via the GUI 152 of the mobile computing device 110 indicating the result, which is then sent from the mobile computing device 110 to the connected services server 120 in step 424 and stored in the connected services database 122 in step 426.

The second example deals with an inspection of Device 2, which is an exemplary connected fire alarm device 109. In this example, the inspection proceeds in the same manner as with Device 1, except in this case, in step 428, the fire alarm device 109 is activated directly by the inspector 108 (for example, using a testing apparatus 107 such as a hood that surrounds a smoke detector 109-1 and introduces artificial smoke to activate the device) instead of by the control panel 102.

Figure 4B:
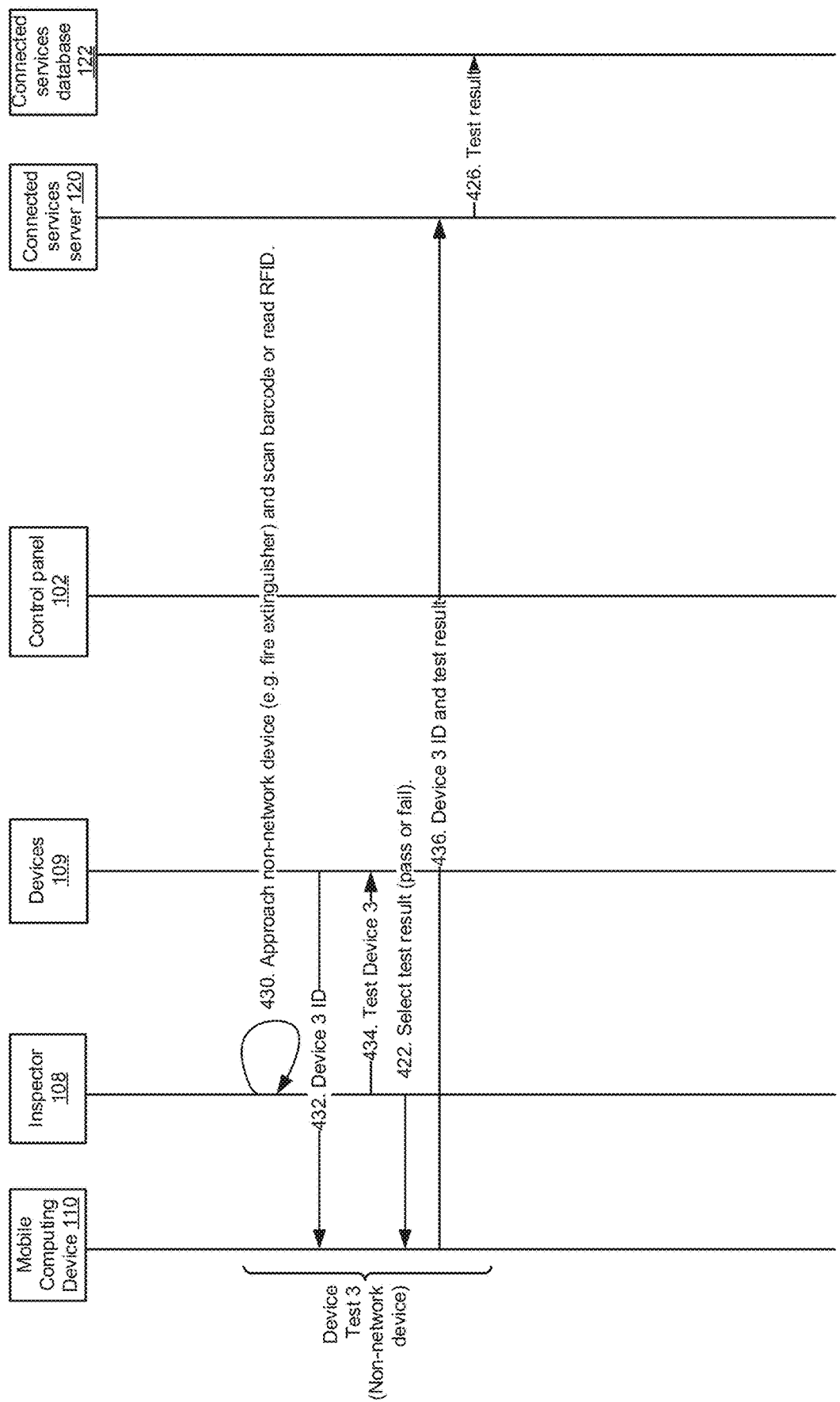
FIG. 4B is a sequence diagram illustrating how the non-network fire alarm devices, control panel, mobile computing device, inspector, connected services server and connected services database interact during an exemplary inspection of a non-network fire alarm device.

FIG. 4B is a sequence diagram illustrating how the non-network fire alarm devices 115, control panel 102, mobile computing device 110, inspector 108, connected services server 120 and connected services database 122 interact during an exemplary inspection of a non-network fire alarm device 115.

This example deals with an inspection of Device 3, which is an exemplary non-network fire alarm device 115 such as a fire extinguisher.

First, in step 430, the inspector 108 approaches Device 3 and interacts with the identification mechanism 160, for example, by scanning a barcode or reading an RFID tag using the mobile computing device 110. In response, in step 432, a device identification (such as a code) associated with Device 3 is received by the mobile computing device 110. In step 434, the inspector 108 then tests Device 3, for example, by visually inspecting the device. The rest of the inspection mostly proceeds according to the previously described steps 422-426, except that, in step 436, the device identification for Device 3 is sent to the connected services server 120 along with the test result. The connected services server 120 uses the device identification to store the test result with a record associated with Device 3 in the connected services database 122.

Figure 4C:
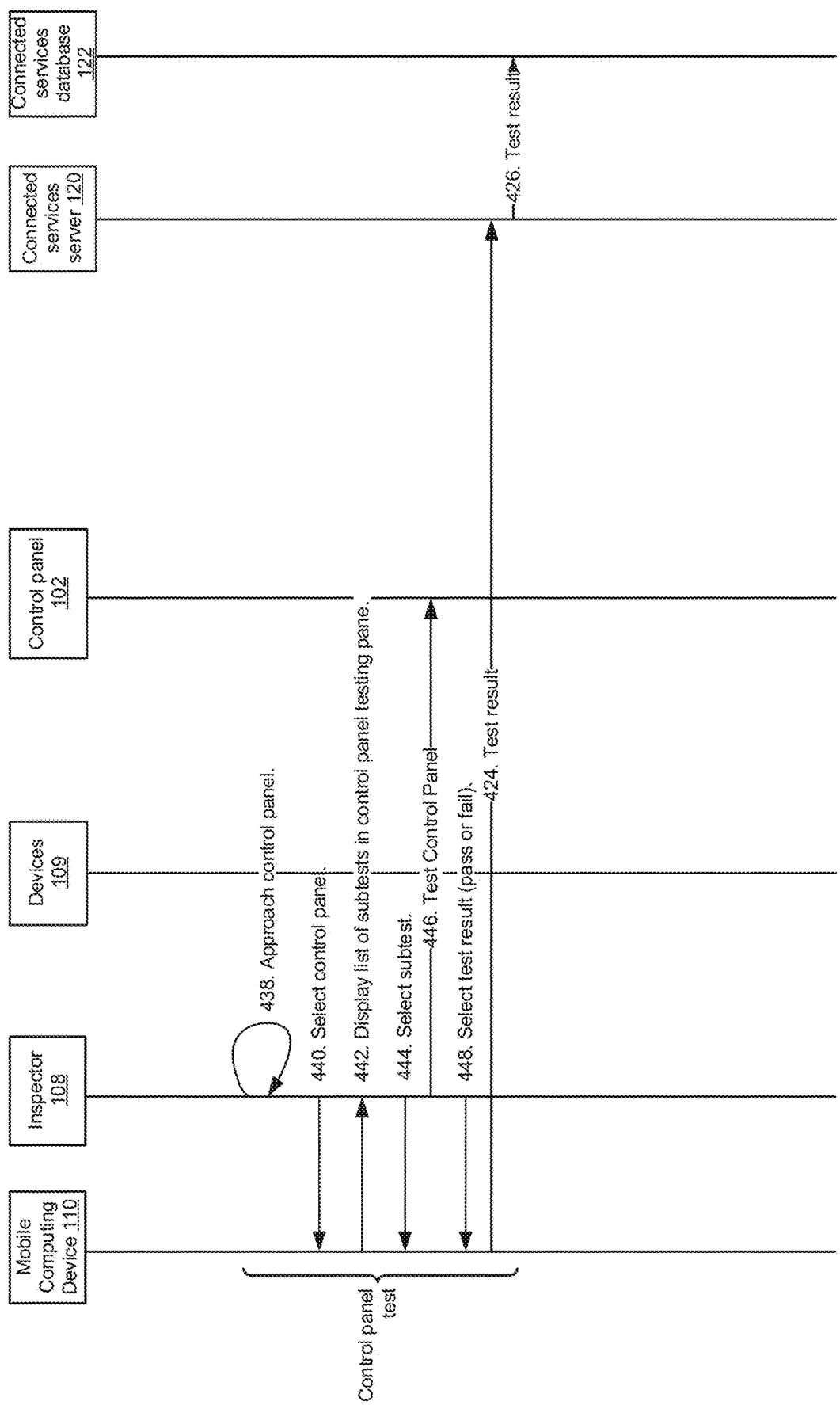
FIG. 4C is a sequence diagram illustrating how the control panel, mobile computing device, inspector, connected services server, and connected services database interact during an exemplary inspection of the control panel.

FIG. 4C is a sequence diagram illustrating how the control panel 102, mobile computing device 110, inspector 108, connected services server 120 and connected services database 122 interact during an exemplary inspection of the control panel 102.

First, in step 438, the inspector 108 approaches the control panel 102 and, in step 440, selects the control panel 102 for inspection via the GUI 152 of the mobile computing device 110. In response, a variety of types of tests of the control panel 102 are indicated by the control panel testing pane 302 of the GUI 152 in step 442. In step 444, the inspector 108 selects one of the tests of the control panel 102, and in step 446, the inspector 108 conducts the test of the control panel 102, for example, by visually inspecting elements of the control panel 102 and confirming whether a series of conditions are true or false. In step 448, the inspector 108 selects the result of the test via the GUI 152 of the mobile computing device 110. The result is then sent to the connected services server 120 in step 424 and stored in the connected services database 122 in step 426.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for inspection of fire alarm devices of a fire alarm system, comprising:
    a mobile computing device executing an inspection application and displaying a graphical user interface of the inspection application rendered on a touchscreen display of the mobile computing device, the graphical user interface comprising a testing pane for indicating the fire alarm devices currently under inspection and for receiving input from an inspector indicating results of the inspections; and
    a connected services system for receiving and storing results of the inspections of the fire alarm devices,
    wherein the results of the inspection of fire alarm devices are indicated by a swipe gesture on a region of the graphical user interface containing a graphical representation of a fire alarm device, after the swipe gesture, a graphical indication of the results of the inspection is displayed in place of the graphical representation of the fire alarm device, and the graphical indication of the results of the inspection disappears after a predetermined period of time.

2. The system as claimed in claim 1, wherein the graphical user interface further comprises displayed information about the fire alarm devices sent from the connected services system to the mobile computing device.

3. The system as claimed in claim 1, wherein the graphical user interface further comprises a selection pane for indicating fire alarm devices to be inspected and for receiving input from the inspector indicating which fire alarm devices are currently under inspection.

4. The system as claimed in claim 1, wherein different results are indicated by the input of the inspector based on whether contact with the touchscreen display detected by the mobile computing device corresponds with a predetermined gesture.

5. The system as claimed in claim 1, wherein devices are removed from being indicated by the testing pane in response to receiving input indicating the results of the inspections of those devices.

6. A method for facilitating inspection of fire alarm systems, the method comprising:
    a mobile application executing on a mobile computing device displaying a graphical user interface on a touchscreen display of the mobile computing device;
    the graphical user interface indicating fire alarm devices currently under inspection and receiving input from an inspector indicating results of inspections of the fire alarm devices;
    the mobile computing device sending the results to a connected services system;
    the connected services system storing the results,
    wherein the results of the inspection of fire alarm devices are indicated by a swipe gesture on a region of the graphical user interface containing a graphical representation of a fire alarm device, after the swipe gesture, a graphical indication of the results of the inspection is displayed in place of the graphical representation of the fire alarm device, and the graphical indication of the results of the inspection disappears after a predetermined period of time.

7. The method as claimed in claim 6, further comprising the graphical user interface displaying information about the fire alarm devices sent from the connected services system to the mobile computing device.

8. The method as claimed in claim 6, further comprising the graphical user interface displaying a selection pane, which indicates fire alarm devices to be inspected and receives input from the inspector indicating which fire alarm devices are currently under inspection.

9. The method as claimed in claim 6, further comprising the input of the inspector indicating different results based on whether contact with the touchscreen display detected by the mobile computing device corresponds with a predetermined gesture.

10. The method as claimed in claim 6, further comprising removing fire alarm devices from being indicated by the testing pane in response to receiving input from the inspector indicating the results of the inspections of those fire alarm devices.

11. The method as claimed in claim 10, further comprising delaying the removal of the fire alarm devices from being indicated by the testing pane for a predetermined period of time, wherein, in response to further input from the inspector, the fire alarm devices are not removed from being indicated by the testing pane, and the results are not sent to the connected services system.

12. The method as claimed in claim 6, further comprising the testing pane indicating fire alarm devices in response to the inspector reading radio-frequency identifications of the fire alarm devices.

13. A method for facilitating inspection of fire alarm systems, the method comprising:
    a mobile application executing on a mobile computing device displaying a graphical user interface on a touchscreen display of the mobile computing device; and
    the graphical user interface displaying a graphical element indicating a proportion of inspected fire alarm devices to a total of fire alarm devices to be inspected, wherein the graphical element indicating a proportion of inspected fire alarm devices to total fire alarm devices to be inspected includes a progress bar that increases in width to indicate that a quantity of inspected fire alarm devices has increased.

14. The method as claimed in claim 13, further comprising the graphical user interface displaying graphical elements indicating a number of fire alarm devices that have passed inspection.

15. The method as claimed in claim 13, further comprising the graphical user interface displaying graphical elements indicating a number of fire alarm devices that have failed inspection.

16. The method as claimed in claim 6, wherein the results of an inspection of fire alarm devices are indicated by a right swipe gesture on the graphical user interface to indicate passage of inspection.

17. The method as claimed in claim 6, wherein the results of an inspection of fire alarm devices are indicated by a left swipe gesture on the graphical user interface to indicate failure of inspection.

18. The method as claimed in claim 6, wherein, during the swipe gesture, continuous contact with the touchscreen display starting at a region containing the graphical representation of a fire alarm device and moving toward the right is detected by the touchscreen display indicating the passage of the inspection of the fire alarm device, and continuous contact with the touchscreen display starting at a region containing the graphical representation of a fire alarm device and moving toward the left is detected by the touchscreen display, indicating the failure of the inspection of the fire alarm device.

19. The method as claimed in claim 18, wherein, during the swipe gesture, the graphical representation of the fire alarm device moves toward the right or toward the left by a distance corresponding to movement of the region in which contact with the touchscreen display is detected.

20. The method as claimed in claim 19, wherein the graphical indication of the results of the inspection appears with a size that increases in proportion to movement of the graphical representation of the fire alarm device.

21. The method as claimed in claim 6, wherein the graphical indication of the results of the inspection is a colored bar with text indicating the passage or the failure of the inspection, wherein a color of the colored bar is based on the results of the inspection.

22. The method as claimed in claim 13, wherein the progress bar includes segments corresponding to different results of the inspection, and widths of the segments are based on quantities of inspected fire alarm devices with the different results.

23. The method as claimed in claim 13, wherein the graphical element includes text indicating percentage of devices to be inspected that have been inspected.

* * * * *